US012694025B2

(12) United States Patent
Potharaju et al.

(10) Patent No.: US 12,694,025 B2
(45) Date of Patent: *Jul. 28, 2026

(54) SERVERLESS DATA LAKE INDEXING SUBSYSTEM AND APPLICATION PROGRAMMING INTERFACE

(71) Applicant: Microsoft Technology Licensing, LLC, Redmond, WA (US)

(72) Inventors: Rahul Potharaju, Redmond, WA (US); Wentao Wu, Bellevue, WA (US); Terry Y. Kim, Bellevue, WA (US); Lev Novik, Bellevue, WA (US); Apoorve Dave, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,336

(22) Filed: Apr. 24, 2024

(65) Prior Publication Data

US 2024/0281437 A1 Aug. 22, 2024

Related U.S. Application Data

(63) Continuation of application No. 17/818,878, filed on Aug. 10, 2022, now Pat. No. 12,007,992, which is a continuation of application No. 16/989,339, filed on Aug. 10, 2020, now Pat. No. 11,449,508.

(60) Provisional application No. 63/020,356, filed on May 5, 2020.

(51) Int. Cl.
G06F 16/2453 (2019.01)
G06F 16/22 (2019.01)
G06F 16/25 (2019.01)

(52) U.S. Cl.
CPC .... *G06F 16/24542* (2019.01); *G06F 16/2272* (2019.01); *G06F 16/254* (2019.01)

(58) Field of Classification Search
CPC ...................... G06F 16/24542; G06F 16/2272
See application file for complete search history.

(56) References Cited

U.S. PATENT DOCUMENTS

| | | | | |
|---|---|---|---|---|
| 9,378,229 | B1 * | 6/2016 | Burger | ................ G06F 16/2272 |
| 2003/0126127 | A1 * | 7/2003 | Abdo | .................. G06F 16/2462 |
| 2005/0203940 | A1 * | 9/2005 | Farrar | ..................... G06F 16/21 |
| | | | | 707/999.102 |

(Continued)

FOREIGN PATENT DOCUMENTS

CN 103229173 A 7/2013

OTHER PUBLICATIONS

Extended European search report received for European Patent Application No. 24169359.7, Oct. 30, 2024, 8 pages.

(Continued)

*Primary Examiner* — Grace Park

(57) ABSTRACT

Methods, systems and computer program products are described herein that provide a serverless, multi-engine, multi-user data lake indexing subsystem and application programming interface. Indexes are defined as derived datasets and stored on the data lake in a universal format that enables disparate engines to create and/or discover indexes for workload optimization. Embodiment of indexes enable stateful control and management of an index via metadata included in the index and stored on the data lake.

20 Claims, 17 Drawing Sheets

1300

(56) References Cited

U.S. PATENT DOCUMENTS

| | | |
|---|---|---|
| 2010/0257151 A1 | 10/2010 | Lohman |
| 2013/0254210 A1 | 9/2013 | Morris |
| 2014/0081979 A1 | 3/2014 | Pn |
| 2018/0276276 A1 | 9/2018 | Eidson |
| 2019/0311068 A1 | 10/2019 | Clay |

OTHER PUBLICATIONS

Skluzacek, et al., "Serverless Workflows for Indexing Large Scientific Data", Proceedings of the 5th International Workshop on Serverless Computing, Dec. 9, 2019, pp. 43-48.
Communication pursuant to Rules 70(2) and 70a(2) received in European Application No. 24169359.7, mailed on Dec. 2, 2024, 2 Pages.
Communication under Rule 71(3) Received in European Patent Application No. 24169359.7, mailed on Sep. 11, 2025, 07 pages.
First Examination Report Received for Indian Application No. 202217062619, mailed on Jun. 25, 2025, 07 pages.
Intimation of Grant Received for Indian Application No. 202217062619, mailed on Sep. 23, 2025, 1 page.
First Office Action Received for Chinese Application No. 202180032980.1, mailed on Dec. 6, 2025, 07 Pages (English Translation Provided).
Decision to Grant a European patent pursuant to Article 97(1) received in European Application No. 24169359.7, mailed on Jan. 9, 2026, 2 Pages.
Extended European search report received in European Application No. 26150776.8, mailed on Apr. 8, 2026, 9 pages.
Communication pursuant to Rules 70(2) and 70a(2) EPC and reference to Rule 39(1) EPC received for European Application No. 26150776.8, mailed on May 11, 2026, 2 pages.
Notice of Grant Received for Chinese Application No. 202180032980.1, mailed on May 25, 2026, 4 Pages. (English Translation Provided).

* cited by examiner

Figure 1:
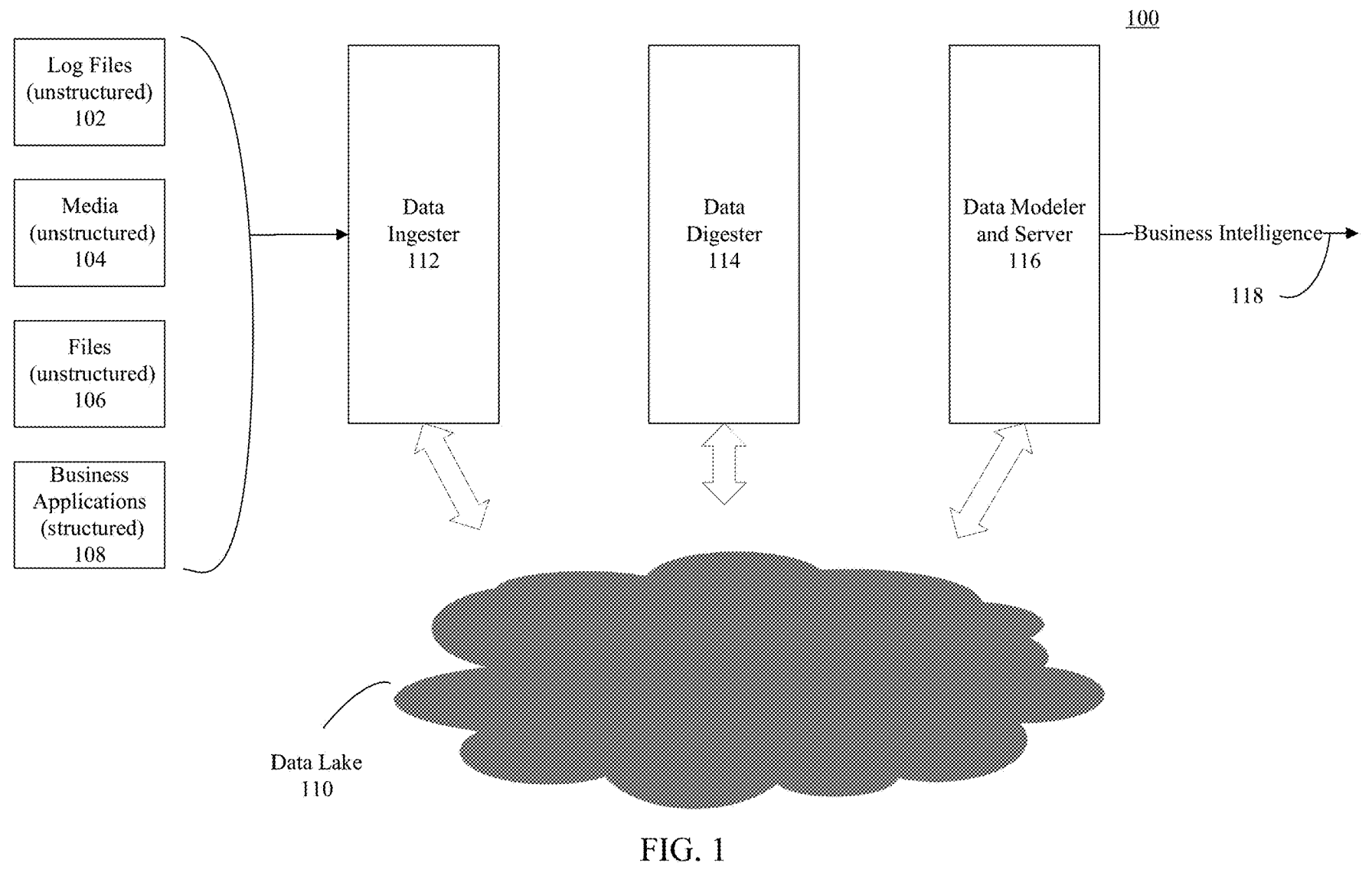

100

Business Intelligence

118

Data Modeler and Server 116

Data Digester 114

Data Ingester 112

Data Lake 110

Log Files (unstructured) 102

Media (unstructured) 104

Files (unstructured) 106

Business Applications (structured) 108

```
1    // Index Maintenance
2    createIndex(df: DataFrame,
3                 indexCfg: IndexConfig): Unit
4    deleteIndex(indexName: String): Unit
5    restoreIndex(indexName: String): Unit
6    vacuumIndex(indexName: String): Unit
7    rebuildIndex(indexName: String): Unit
8    cancel(indexName: String): Unit
9
10   // Debugging and Recommendation
11   explain(df: DataFrame): Unit
12   whatIf(workload: Array[DataFrame],
13          indexCfg: IndexConfig): Cost
14   recommend(query: Array[DataFrame],
15             options: RecOptions): Recommendation
16
17   // Configuration for Storage & Query Optimizer
18   indexing_subsystem.system.path
19   indexing_subsystem.creation.[path | namespace]
20   indexing_subsystem.search.[path | namespace]
21   indexing_subsystem.search.disablePublicIndexes
```

FIG. 4

900
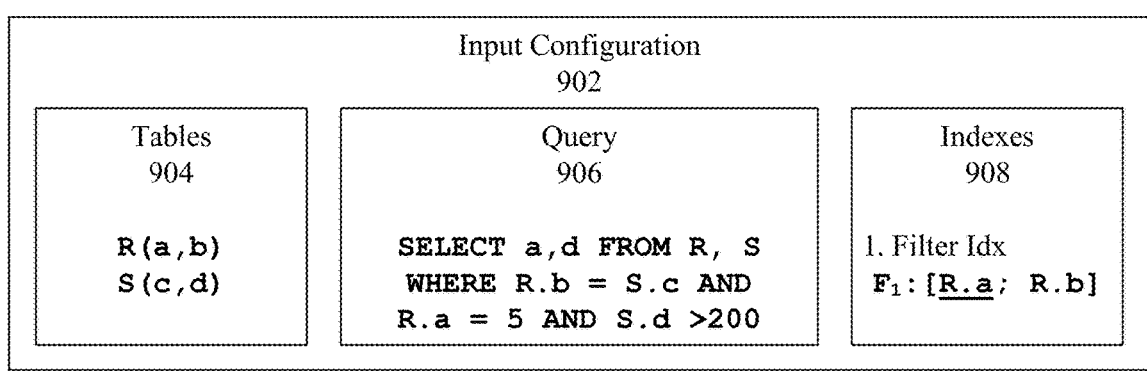
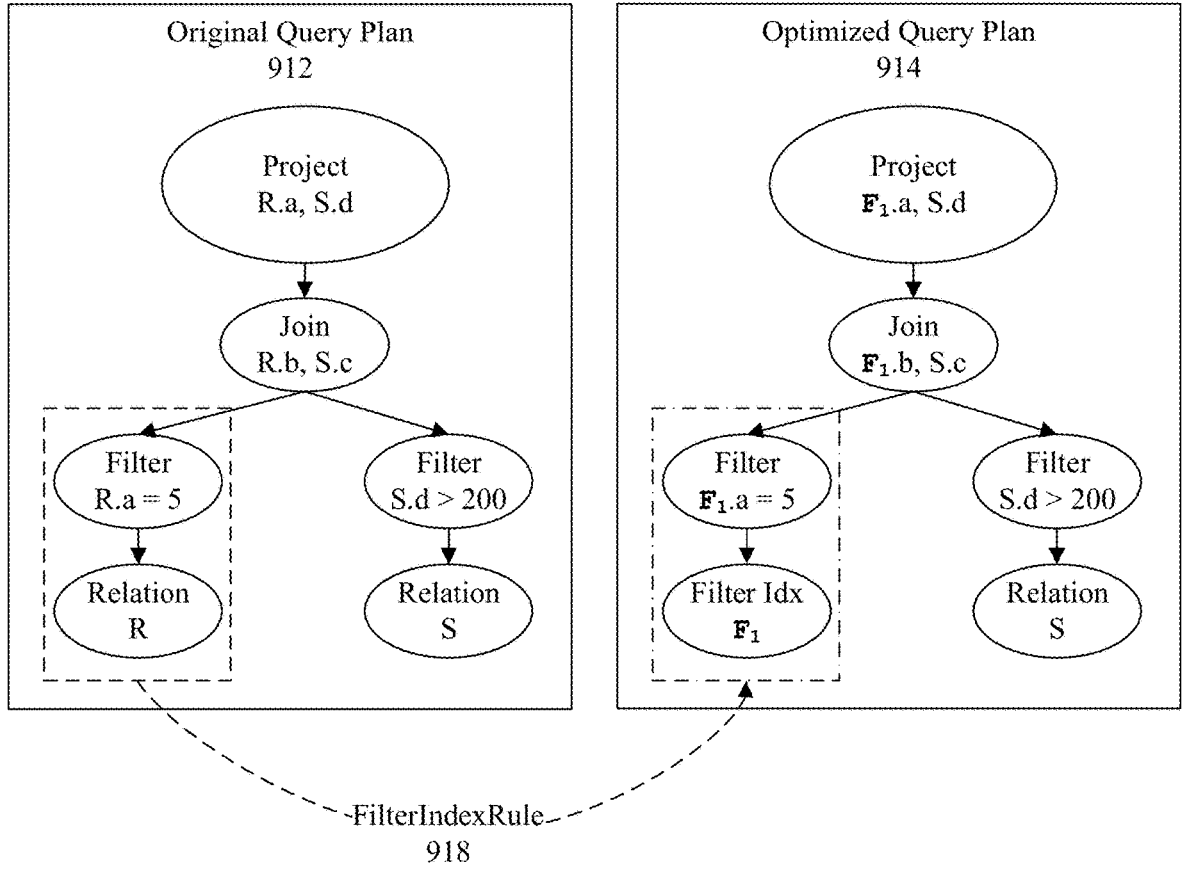
FIG. 9

1000
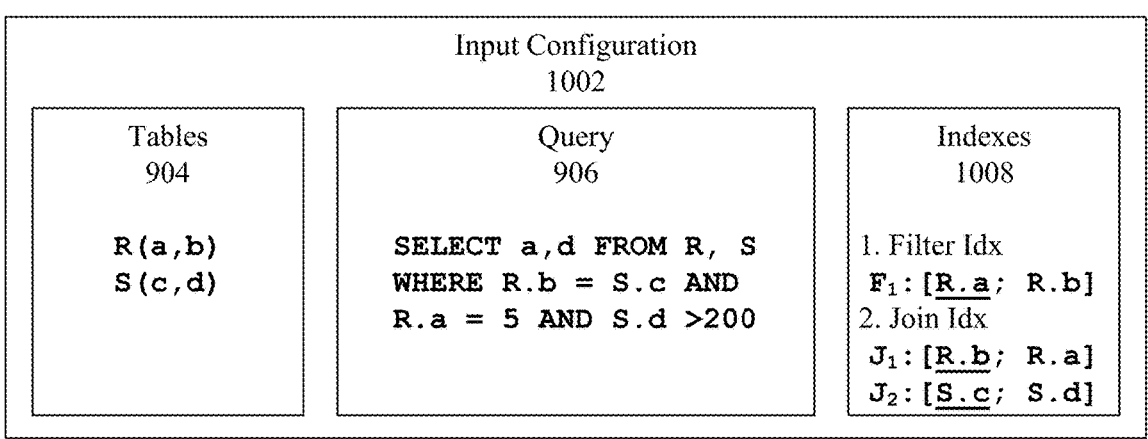
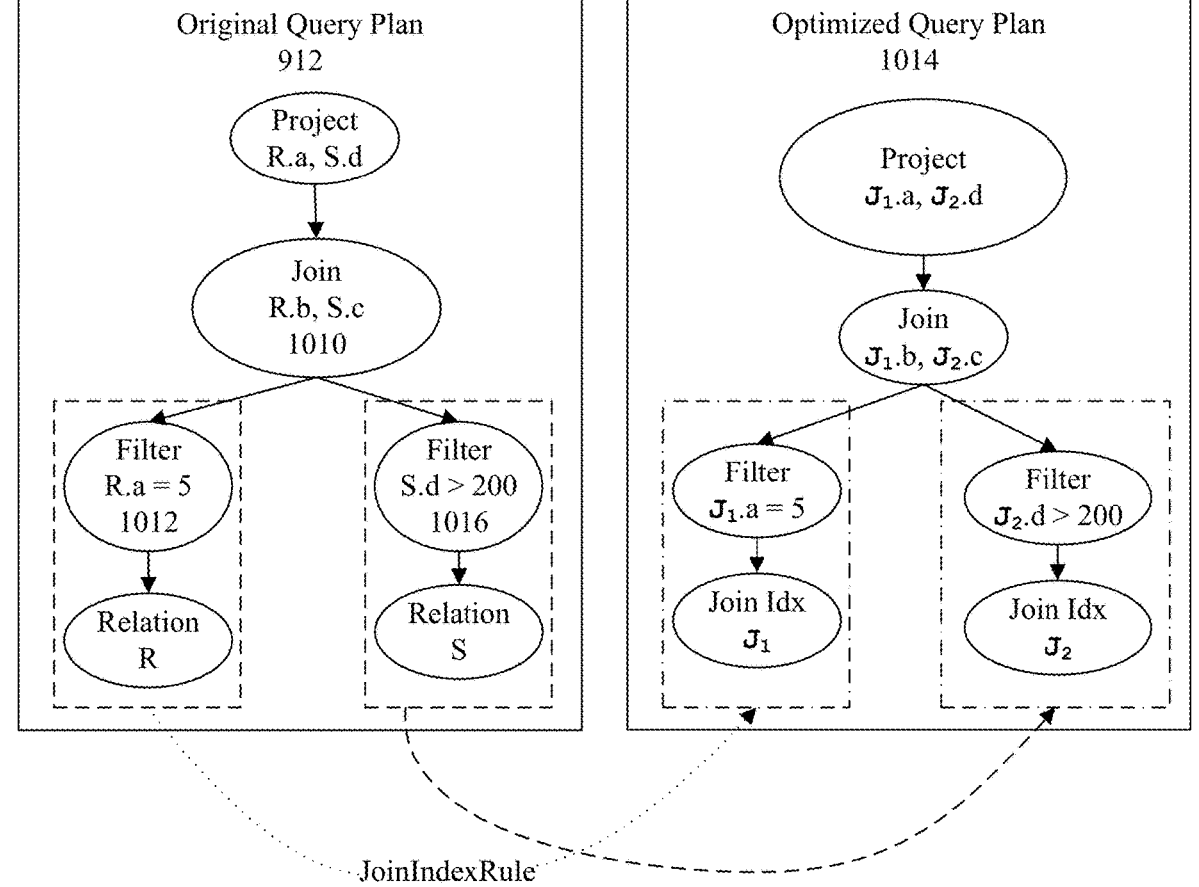
FIG. 10

1200

1300

Workload Optimization System 1302

Candidate Index Generator 1304

Candidate Indexes 1306

Index Selector 1308

Selected Indexes 1310

Query Processor 1312

Built Indexes 1314

Query 1316

Query Result 1318

Workload 1104

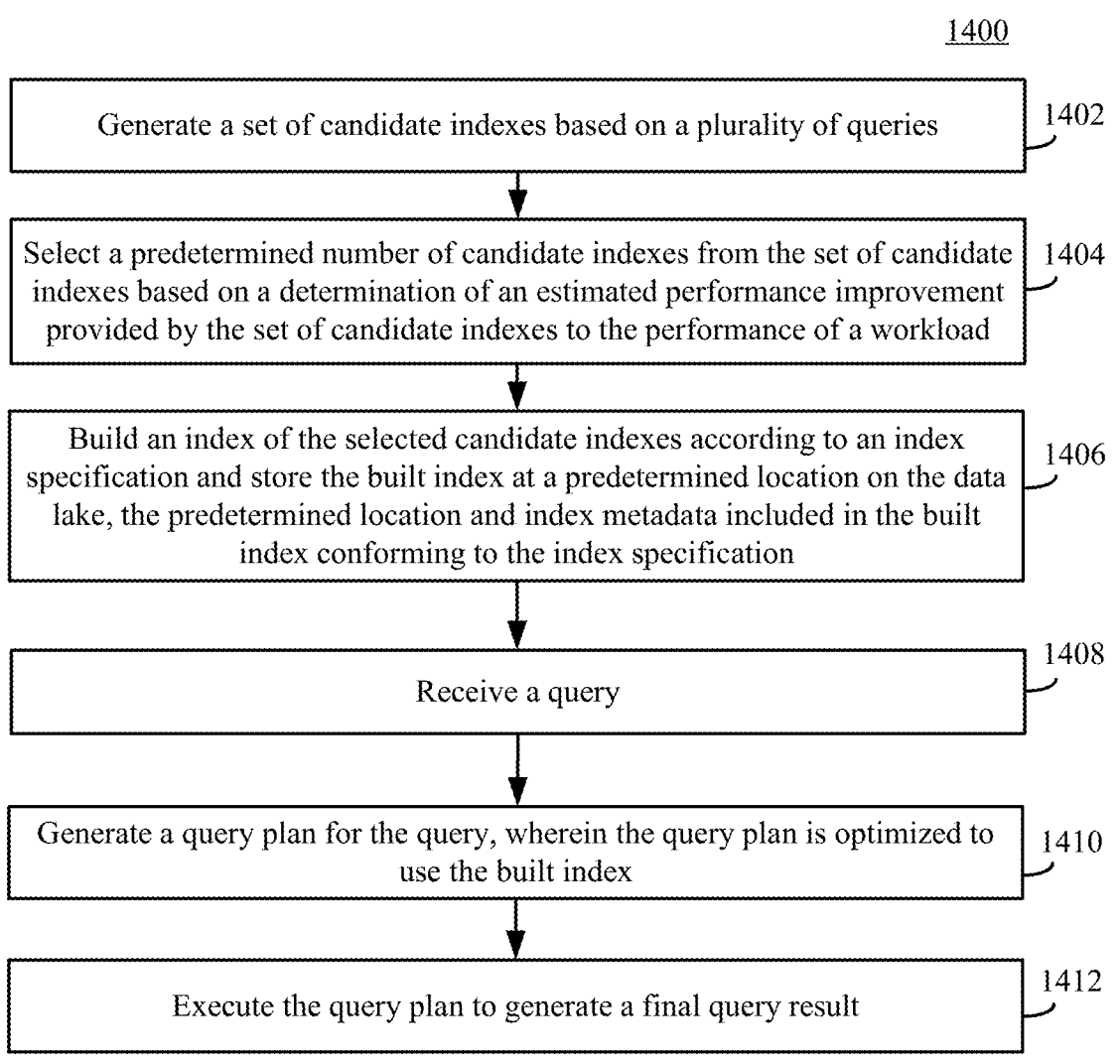

<u>1400</u>

Generate a set of candidate indexes based on a plurality of queries — 1402

Select a predetermined number of candidate indexes from the set of candidate indexes based on a determination of an estimated performance improvement provided by the set of candidate indexes to the performance of a workload — 1404

Build an index of the selected candidate indexes according to an index specification and store the built index at a predetermined location on the data lake, the predetermined location and index metadata included in the built index conforming to the index specification — 1406

Receive a query — 1408

Generate a query plan for the query, wherein the query plan is optimized to use the built index — 1410

Execute the query plan to generate a final query result — 1412

CREATE INDEX Query 1610

```
CREATE INDEX myCoveringIndex
ON dirLocation1 INDEX(a, b)
INCLUDE (c)
```

SERVERLESS DATA LAKE INDEXING SUBSYSTEM AND APPLICATION PROGRAMMING INTERFACE

CROSS-REFERENCE TO RELATED APPLICATIONS

This application is a continuation of U.S. application Ser. No. 17/818,878, filed on Aug. 10, 2022, titled "SERVER-LESS DATA LAKE INDEXING SUBSYSTEM AND APPLICATION PROGRAMMING INTERFACE," now allowed, which is a continuation of U.S. application Ser. No. 16/989,339, filed on Aug. 10, 2020, titled "SERVERLESS DATA LAKE INDEXING SUBSYSTEM AND APPLICA-TION PROGRAMMING INTERFACE", now issued as U.S. Pat. No. 11,449,508, which claims benefit and priority to U.S. Provisional Patent Application No. 63/020,356 filed May 5, 2020, each of which are incorporated by reference herein in their entireties.

BACKGROUND

The amount of raw data in all forms generated by business organizations, science researchers and the like may be quite large, on the order of hundreds of petabytes. Modern sys-tems often gather and generate data at a rate many times greater than such data can be usefully categorized and managed. Data lakes have seen increasing adoption in such instances. A "data lake" is a data storage platform configured to store such quantities of raw data in native form whether structured or unstructured. The vast scale of a data lake, along with the oftentimes unstructured nature of the data, may make it difficult to make productive use of all the information that may be gleaned from the data.

A "data warehouse", on the other hand, typically houses structured or processed data that may be more easily manipulated for various business intelligence or research needs. A data warehouse does not, however, have nearly the same scale as a data lake, and the retrievable information may therefore be more limiting.

The overall trend, however, has been toward convergence of lakes and warehouses. For example, data warehouse offerings are increasingly offering enhanced capabilities in data diversity and scale to approach capabilities of data lakes. Data lake offerings are showing the emergence of support in data lakes for efficiently updatable and versioned relational data with change tracking, and competitive rela-tional query capabilities at very large scale. Likewise, data lake offerings are increasingly providing support for rela-tional tool chains for reporting, data orchestration, security, sharing, compliance, and governance.

There historically has been a huge demand for indexing support from traditional data warehouse systems to be provided on data lake systems. Though there are many ways to improve query performance in database systems, indexes are particularly efficient in providing tremendous accelera-tion for certain workloads because they can reduce the amount of data retrieved for a given query. However, providing indexing solutions in the context of distributed database systems and/or cloud-based architectures presents some challenges. For example, a key driver of the adoption of cloud-based models is the flexibility to store and subse-quently query data using any query engine. Unfortunately, disparate query engines typically cannot use common indexes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Query engines and systems are described herein that enable multi-engine data workload optimization via an index specification and API consumable by disparate query engines for creating, discovering and using indexes stored in a discoverable location on a data lake, and which conform with the index specification. In an example aspect, a system is configured to accept a workload in the form of a plurality of data queries, extract indexable columns from the queries, generate candidate indexes from the indexable columns, select and then build the best candidate indexes, wherein the built indexes conform to an index specification and are stored in a predetermined location on the data lake. In an additional aspect, a query engine in the system may receive a query, generate a query plan for the query configured to use one or more of the built candidate indexes, and execute the query plan to generate a query result.

In are further example aspect, built indexes include index metadata that describes the contents and lineage of each respective built index, and that reflects the state of the index. In another aspect, built index lineage includes query plan information that corresponds to the query used to create the built index.

In a further aspect, the system includes a second query engine configured to search the data lake for built indexes stored at the predetermined location, receive a query, gen-erate a query plan for the query, determine based on the index metadata for each built index whether the respective index may be used to optimize the query plan and if so, optimize the query plan to use the respective built index and execute the optimized query plan to provide a query result.

Further features and advantages, as well as the structure and operation of various examples, are described in detail below with reference to the accompanying drawings. It is noted that the ideas and techniques are not limited to the specific examples described herein. Such examples are pre-sented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodi-ments of the present application and, together with the description, further serve to explain the principles of the embodiments and to enable a person skilled in the pertinent art to make and use the embodiments.

FIG. 1 depicts an example data lake system, according to an embodiment.

FIG. 4 depicts example data lake indexing and query system application programming interfaces (APIs), accord-ing to an embodiment.

FIG. 9 depicts an example application of a Filter Index Rule to a SQL query, according to an embodiment.

FIG. 10 depicts an example application of a Join Index Rule to a SQL query, according to an embodiment.

FIG. 14 depicts a flowchart of a method for workload optimization performed at a first query engine in a distributed query processing system, according to an embodiment.

Figure 2:
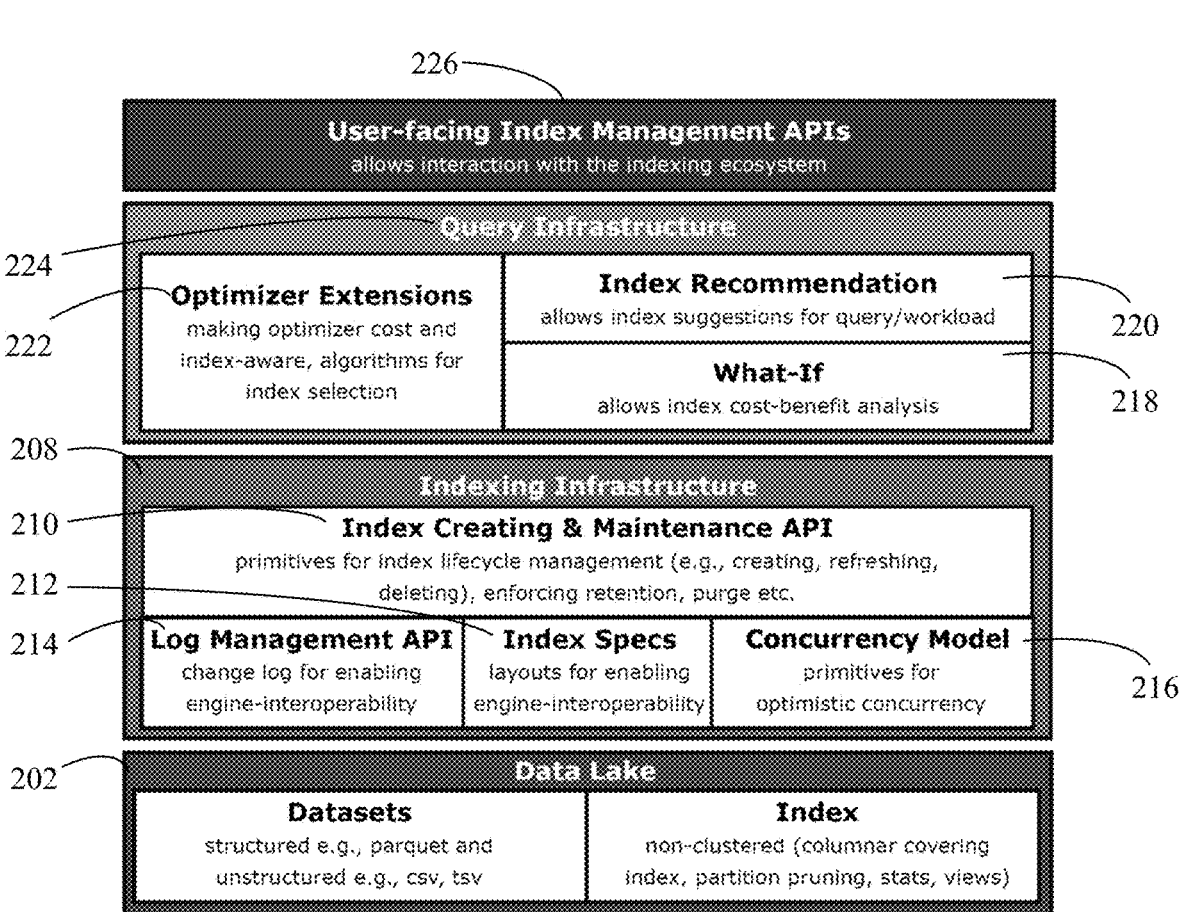
FIG. 2 depicts a hierarchical view of a data lake indexing and query system, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments disclosed herein bring multi-engine interoperability to data lakes, and may include guided, semi-guided, or automatic index selections to allow users to optimize their workloads. Moreover, to lower operational costs, to further enable multi-engine interoperability while also enabling multi-user concurrency, embodiments disclosed herein embody a "serverless" index management strategy. In this section, we present an overview of the operating environment of the disclosed embodiments as depicted in FIG. 1.

FIG. 1 depicts an example data lake system 100, according to an embodiment. Data lake system 100 is depicted to include generalized components dedicated to various high-level functions. Data lake system 100 includes a data ingester 112, a data digester 114, a data modeler and server 116. Data lake system 100 further includes a data lake 110 that interfaces with data ingester 112, data digester 114, and data modeler and server 116, and enables data to be written or read thereby to and from data lake 110.

Conceptually, data ingester 112 is configured to accept structured or unstructured data and store such data in data lake 110. Such data may include, for example, log files 102 (unstructured), media 104 (unstructured), files 106 (unstructured), and/or business applications 108 including any underlying schema (structured). Note, such data categories are merely exemplary. A data lake such as data lake 110 is typically configured to accept and store any type of data in its native format. Through data ingester 112, data lake 110 may come to be populated with huge amounts of data ranging into the hundreds of petabytes or even more.

Making productive use of such huge amounts of data may be enabled through the combined operations of data digester 114 and data modeler and server 116. In embodiments, data digester 114 is configured to process the unstructured data on data lake 110 to provide a structured or semi-structured and curated view of at least some of the data contained therein. Such views may thereafter be leveraged by permit data modeler and server 116 for various purposes including producing business intelligence 118, or other useful outputs. Essentially, data modeler and server 116 may be configured to operate in a manner analogous to conventional data warehouses, but over the entire data lake as processed by data digester 114.

Embodiments described herein may be implemented in various ways. For example, embodiments may be implemented in/on data modeler and server 116 to provide a data lake indexing and query system. However, other structural and operational embodiments will be apparent to persons skilled in the relevant art(s).

Further embodiments are described as follows along with motivating advantages in light of example APIs. Additionally, auxiliary data structures provided by embodiments are also described. The workload optimization embodiments disclosed herein may be implemented in conjunction with and operate using a number of different query engines. In the context of this disclosure, however, embodiments are described in terms of Apache Spark. One skilled in the art will appreciate, however, that Apache Spark is a mere example query engine and is not a necessary component of any embodiment. Other types of query engines may be present.

Embodiments of the indexing system described herein may include one or more of the following advantages:

1: Agnostic to data format. To support the most diverse scenarios, the indexing subsystem should be able to index data stored in the lake in any format, including text data (e.g., CSV, JSON, Parquet, ORC, Avro, etc.) and binary data (e.g., videos, audios, images, etc.). Moreover, the data is considered as externally managed, i.e., control over the lifecycle of the datasets is NOT assumed.

2: Low-cost index metadata management. To avoid burdening the query optimizer and the end-user, index metadata should be light-weight, fast to retrieve, and operate independent of a third-party catalog. In other words, the indexing subsystem should only depend on the data lake for its operation and should not assume the presence of any other service to operate correctly.

3: Multi-engine interoperability. The indexing subsystem should make third-party engine integration easy. To achieve this, embodiments expose (a) index state management and (b) index metadata in as transparent a way as possible.

4: Simple and guided user experience. The indexing subsystem should support diverse users including data scientists, data engineers, and data enthusiasts. Therefore, it should offer the simplest possible experience.

5: Extensible indexing. Because it is often impractical to provide all possible auxiliary data structures that aid in query acceleration, our indexing subsystem should offer mechanisms for easy pluggability of newer auxiliary data structures (related to indexing).

6: Security, Privacy, and Compliance. Because auxiliary structures such as indexes, views, and statistics copy the original dataset either partly or in full, the indexing subsystem should meet the necessary security, privacy, and compliance standards.

These advantages, particularly multi-engine interoperability, are furthered by reconsidering indexes as "derived datasets." While indexes were traditionally built and maintained as auxiliary data structures internal to a database management system ("DBMS"), in a data lake, because there is no single "database system," embodiments described herein treat indexes as a form of derived data—data that has been derived from one or more datasets and may be optionally used by an arbitrary query optimizer to improve the speed of data retrieval. Treating indexes as derived datasets may have very few basic assumptions: (1) that such derived datasets support basic lifecycle operations such as create, delete, (either full or incremental) rebuild, and restore, and (2) they can be leveraged for query acceleration (in particular, be readily leverage by and/or integrated into with query optimizers and execution runtimes). Therefore, embodiments support virtually any type of index including, for example, covering indexes, zone maps, materialized views, indexed view (i.e., an index on a materialized view), statistics, and chunk-elimination indexes. Accordingly, each of the enumerated examples herein above are properly considered when the term "index" is used herein below, but "index" may also include any other type of derived dataset that satisfies the above described assumptions. However, for the sake of context and completeness, a few examples of derived datasets are described as follows.

Covering Index. Covering indexes are efficient in scenarios where certain selection and filter columns co-occur frequently in queries. They have the following properties:

1. Non-clustered—index is separated from the data.
2. Covering—index contains both key columns (i.e., "indexed columns" as the term is used herein below) and data/payload columns (i.e., "included columns" also as the term is used herein below); these data/payload columns are duplicated from the original data (for "index only" query access paths).
3. Columnar—index is stored in some columnar format (e.g., Parquet) rather than a row-oriented format such as a B-tree. This allows leveraging techniques such as vectorization along with min-max pruning to accelerate scans over indexes.

With all columns in the query being included in the covering index either as key or non-key columns, query performance can be significantly improved. Additional physical layout properties (such as bucketization, partitioning, and sort order) can speed up workhorse operators such as filter and join that typically dominate query execution time. In embodiments, all columns marked as "indexed columns" by the user may be bucketized and (optionally) sorted.

Chunk-Elimination Index. For queries that are highly selective (e.g., searching for a single GUID amongst billions), a class of indexes called "chunk-elimination indexes" may be advantageously employed. Chunk-elimination indexes are analogous to a traditional inverted index, except that the pointer is an arbitrary URI (as opposed to a row_id) that refers to a chunk, a reasonable unit of addressable data stored in data lake (e.g., a single Parquet file or an offset range within a large CSV file). An optimizer can leverage this index to quickly prune irrelevant blocks for a query.

Materialized Views. For expensive queries with joins or aggregations, materialized views may be created as derived datasets. These materialized views can then be used transparently by the underlying query optimizer.

Statistics. In environments with cost-based query optimizers, embodiments may enable collection of statistics (e.g., histograms) a priori for columns of interest. A capable optimizer can then leverage these statistics at runtime to optimize resources.

With the benefit of the above described advantages and background, further detailed description now turns to an architectural overview of a data lake indexing and query system, according to an embodiment. More specifically, FIG. 2 depicts an example hierarchical view 200 of a data lake indexing and query system, according to an embodiment. As shown in FIG. 2, the data lake indexing and query system 200 includes a data lake 202, an indexing infrastructure 208, a query infrastructure 224 and a set of user-facing index management APIs 226. Indexing infrastructure 200 supplies and includes a log management API 214, index specifications 212, a concurrency model 216 and on top of these, a set of index creating & maintenance API 210. Query infrastructure 224 of data lake indexing and query system 200 include a set of optimizer extensions 222, an index recommendation system 220 and a "what-if" utility 218. Other structural and operational embodiments will be apparent to persons skilled in the relevant art(s) based on the following discussion regarding data lake indexing and query system 200 as depicted in FIG. 2.

In an embodiment, users can utilize indexing infrastructure 208 (available as a service or a library) to create and maintain indexes (or "derived datasets") on their data through the index creation and maintenance API (described further herein below). For example, indexing infrastructure 208 may be implemented as one or more extensions to the sparkSession object of Apache Spark, and wherein a user may use a suitable data access client (e.g., spark-shell) can create a non-clustered columnar covering index, specify which the columns on which to create an index, and the columns to include as data columns i.e., with a query like: CREATE INDEX myCoveringIndex ON dirLocation1 INDEX(a, b) INCLUDE (c). Note that embodiments do not require a separate "indexing service", because indexing infrastructure 208 can, in principle, leverage any available query engine (e.g., Spark) for index construction. As described in greater detail below, indexes and their metadata are stored on the data lake itself and for this reason, users can parallelize index scans to the extent that their query engine scales and their environment/business allows.

In embodiments, index metadata maintenance is managed by an index manager (not shown in FIG. 2) controlled through index creating and maintenance API 210. The index manager takes charge of index metadata creation, update, and deletion when corresponding modification happens to the index data, and thus governs consistency between index data and index metadata. The index manager also provides utility functions to read the index metadata from its serialized format. For example, the query optimizer can read all index metadata and then find the best index for given queries.

Embodiments may also enable primitive components underlying index creating and maintenance API 210. For example, such primitive components may comprise any or all of log management API 214, index specifications 212, or concurrency model 216.

As mentioned above and described in more detail below, support for multi-engine interoperability motivated the need to store all the indexes and their metadata on the lake. To track the lineage of the operations that take place over an index, embodiments record user operations in an operation log as described in greater detail herein below and may do so through log management API 214.

Index specifications 212 support the extensibility advantage described above, because embodiments relate to index specifications 212 that reflect the properties of the corresponding underlying indexes (or derived datasets). These are exposed via index creating & maintenance API 210 and those wishing to extend the system to include other types of indexes/derived datasets must implement support for these APIs.

Finally, concurrency model 216 exposes primitives to support multi-user and incremental maintenance scenarios using optimistic concurrency control (as described further herein below).

Discussion now turns to the other major layer above the data lake, that of query infrastructure 224. Without loss of generality, components of query infrastructure 224 are described herein as being implemented as a Scala version library as an extension of the Apache Spark query optimizer (a.k.a., Catalyst) to make it index-aware. That is, given a query along with an existing index, embodiments implemented with Spark can perform transparent query rewriting to utilize the existing index. To enable optimizer extensions 222 one the user's side, one needs to execute sparkSession-.enableIndexingSubSystem( ) after creating the Spark session. Because embodiments treat an index as being just another dataset on the lake, users can exploit Spark's distributed nature to automatically scale index scans. Though embodiments are described above and hereinafter in terms of Spark and Scala, it should be understood that other embodiments may employ programming languages other than Scala, and query engines other than Spark.

While embodiments described herein introduce the notion of indexing on a data lake, an important aspect of big data administration that critically influences performance is the ability to select indexes to build for a given query or a workload. To decide the right indexes for a workload, it is crucial for users to be able to perform a cost-benefit analysis of the existing indexes and any 'hypothetical' indexes they have in mind. Query infrastructure 224 includes, therefore a "what if" utility 218 that allows users to quantitatively analyze the impact of existing or hypothetical indexes on performance of the system. Moreover, query infrastructure 224 further includes index recommendation module 220 that exposes automated index recommendations for automating the choice of indexes in query acceleration for big data workloads. The tool takes as input a workload of SQL queries, and suggests a set of suitable indexes. Implementation details of index recommendation module 220 and the "what if" utility 218 are described in greater detail herein below.

Figure 3:
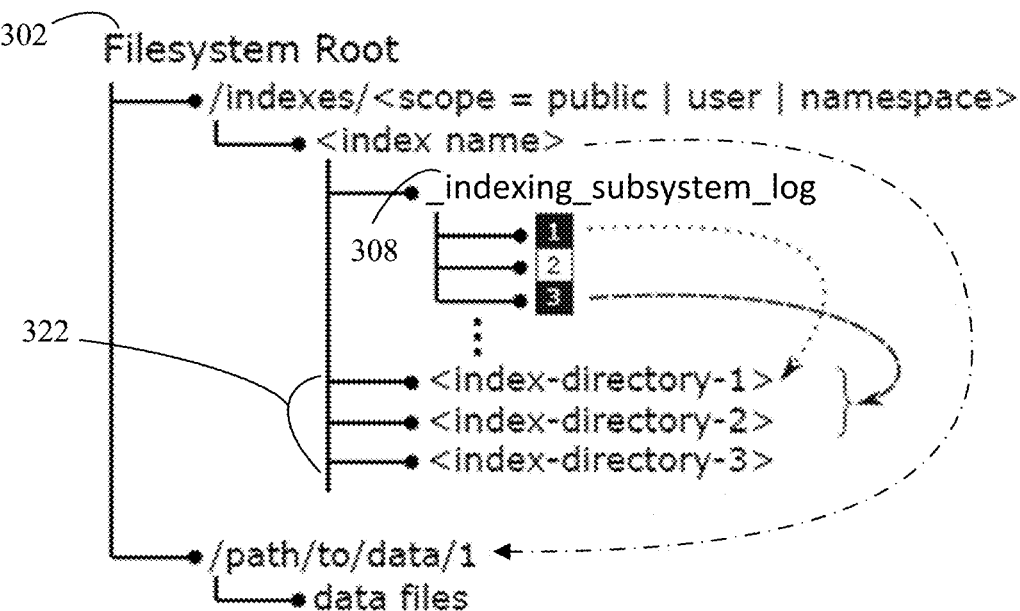
FIG. 3 depicts an example hierarchical organization dia-gram of index metadata on a data lake, according to an embodiment.

As mentioned herein above, embodiments store all index data and metadata on the data lake itself without any external dependencies. FIG. 3 depicts an example hierarchical organization diagram 300 of index metadata on the data lake, according to an embodiment. Other structural and operational embodiments will be apparent to persons skilled in the relevant art(s) based on the following discussion regarding hierarchical organization diagram 300 as depicted in FIG. 3.

In one embodiment, all indexes may be stored at the filesystem root 302 as depicted in FIG. 3. Such an arrangement may be advantageous depending on the indexes being employed. For example, indexes may comprise materialized views which themselves may span datasets which in turn necessitates a decoupling of the dataset from the index. In another, embodiment, however, the index may be co-located with the dataset. Embodiments may implement fine-grained access control mechanisms such as, for example, copying the most restrictive access control lists (ACLs) from the datasets being indexes to achieve stricter security and compliance. Because we allow the notion of disabling public indexes, users are free to provide hints to the optimizer with "index sets," thus allowing for A/B testing.

It should be understood, however, that use of filesystem root 302 is merely exemplary, and another default index location may be specified in, for example, index specifications 212 as described herein above. More specifically, multi-engine interoperability is enabled, in part, by index specifications 212 that enable query engines and other clients that have knowledge of and comply with the specifications set forth in index specifications 212 to know in advance the default location for index storage thereby permitting such engines and clients to discover the availability of indexes that may already exist, and thereafter build query plans that incorporate such indexes.

With continued reference to FIG. 3, each index as listed under /indexes/*/<index name> has two components:

1) the directory named _indexing_subsystem_log 308 that contains the operational log of the index, i.e., the list of all operations that happened on this index since its inception; and 2) the actual contents 322 of the index.

Notice that the contents are captured in multiple directories. This is to support functionality such as concurrent index management (e.g., snapshot isolation) and incremental maintenance (e.g., the latest index is a union of the contents of multiple directories).

FIG. 4 depicts example data lake indexing and query system application programming interfaces (APIs) 400 as exposed by embodiments in the context of Apache Spark. Note that the list is merely exemplary and should not be construed as a requirement for every engine nor for every embodiment. Other structural and operational embodiments will be apparent to persons skilled in the relevant art(s) based on the following discussion regarding APIs 400 as depicted in FIG. 4.

APIs 400 include index maintenance APIs at lines 2-8, which include APIs corresponding to actions such as create, delete, restore, vacuum, rebuild (sometimes referred to as "refresh", particularly when the rebuild is incremental), and cancel. The deleteIndex API of line 4 corresponds to a "soft delete," in embodiments, which tells the optimizer to not consider this index during optimization. The actual index referenced by the API calls is not permanently deleted, thus allowing the user to recover the deleted index using the restoreIndex API as shown on line 5. Alternately, the user can permanently delete an index already in a soft-delete state using the vacuumIndex API as shown in line 6. The rebuild-Index API at line 7 enables the aforementioned rebuild/refresh operationed. Users can cancel on-going index maintenance operations using the cancel Index API as shown on line 8 and that may be useful if the user suspects that a maintenance job is stuck or has failed.

APIs 400 also include utility APIs for debugging and recommendation as shown at lines 11-15. These API are referred to as explain, whatIf and recommend as shown at lines 11, 12 and 14, respectively. The explain API allows users to obtain various useful information from the optimizer e.g., which part of the plan was modified, which indexes were chosen, why they were chosen, etc. The whatIf API allows users to provide the indexing subsystem with sample index configurations and get an explanation of how useful it would be if the indexes were built. The recommend API allows users to get a ranked recommendation of indexes/views that can be built for a workload of their choice.

APIs 400 also include storage and query optimizer customization configuration settings as shown at lines 18-21. These settings allow the user to override the behavior of the query optimizer and index management. For instance, by default, every index that gets created is discoverable, stored under the public folder, or the filesystem root as discussed herein above, making it accessible to all users at the workspace level. If this is not acceptable, and because indexes are accessible only to the user who created them, the user can choose private index locations and namespaces and thereafter create their private indexes and provide hints to the optimizer during optimization (e.g., by setting the configuration variables indexing_subsystem.index.creation.[path|namespace] and/or indexing_subsystem.index.search.disablePublicIndexes.

Having described the various APIs available in embodiments, discussion now turns to serverless index management enabled by the disclosed embodiments. As mentioned above, an advantage is a low-cost multiengine indexing subsystem that allows for concurrent index maintenance operations on an index that can be invoked by multiple engines. Although embodiments may be implemented with a server to mediate such operations, other embodiments described herein may simplify implementation by making index management "serverless" i.e., embodiments do not require a standalone server dedicated to index management tasks. The serverless functionality is achieved, in part, by storing all index information (e.g., metadata, operations on an index) in the data lake, and having that index track its own state through an index operation log incorporated into the index, and through other updates to its own metadata. Despite being serverless, embodiments enable concurrent updates through optimistic concurrency control (as described in further detail below). Further description of embodiments now turns to further description of one of these aspects: index metadata on the lake.

Interoperability is complex, as every query engine has to agree on what constitutes an index, which may require agreement between developers (and organizations/companies) working in different silo-ed ecosystems. Because the latter problem is much harder in reality, embodiments described herein prioritize a low-friction configuration for exposing index-related metadata (e.g., contents, state etc.) in a way that allows for easy integration. Exposing the state of an index or the list of operations invoked on an index through traditional means, such as a catalog service or a transaction manager service, guarantees strong consistency. However, this approach has a few major operational implications. First, it brings in service dependencies and live-site support overheads. Second, it makes integration complex because now every new engine has to depend on a third-party service. Finally, it introduces operational costs of running the service.

Figures 5A, 5B:
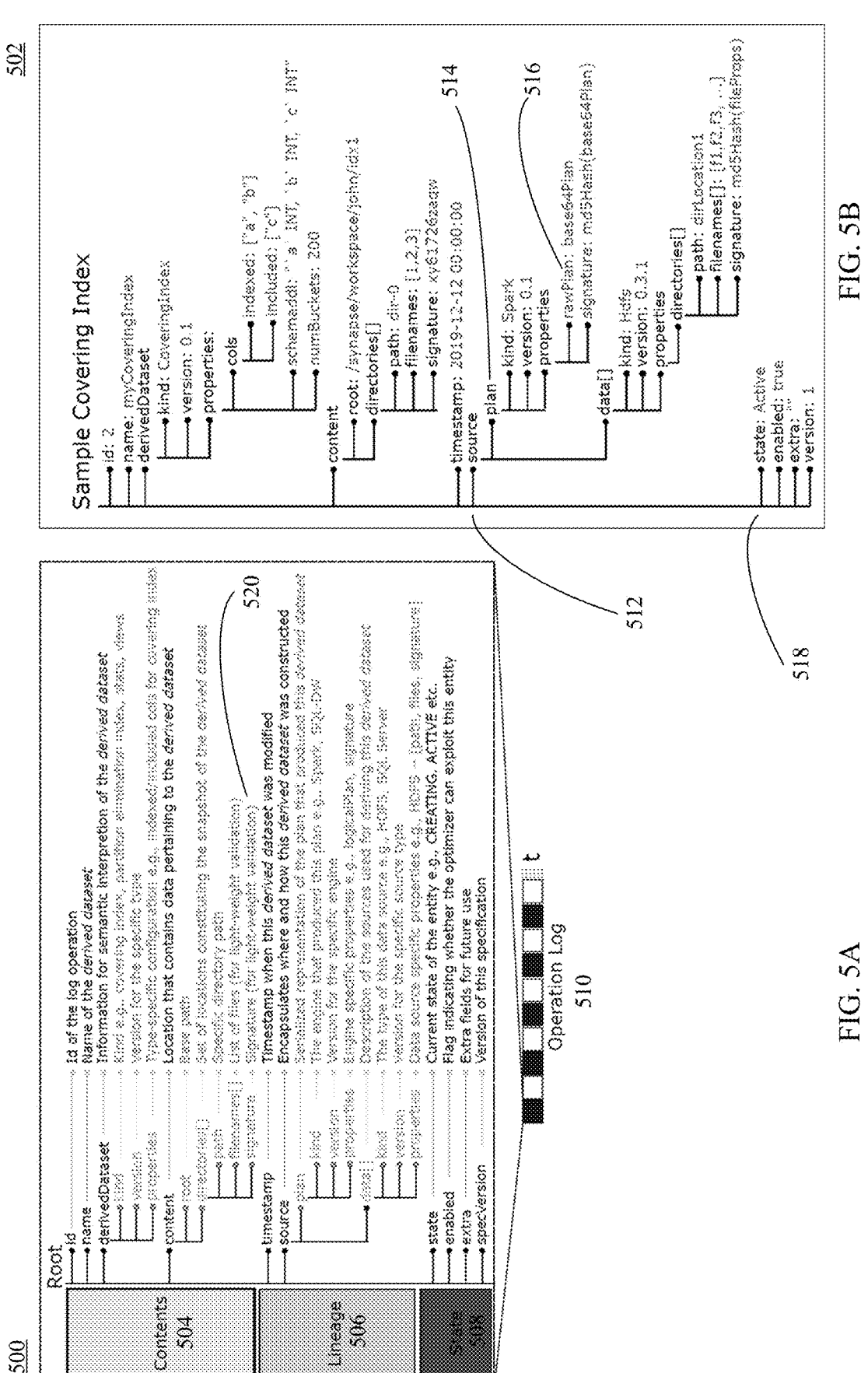
FIG. 5A depicts example index metadata specification, according to an embodiment.
FIG. 5B depicts an example instance of a covering index described according to the example index metadata speci-fication of FIG. 5A, according to an embodiment.

In consideration of these downsides, embodiments described herein trade-off metadata consistency for easier operational maintenance, i.e., the ground truth of information of an index is stored on the data lake. There are numerous ways of specifying the index information that need be stored. For example, FIG. 5A depicts an example index metadata specification 500, according to an embodiment. Index metadata specification 500 includes three parts: a contents 504, a lineage 506 and a state 508. Other structural and operational embodiments will be apparent to persons skilled in the relevant art(s) based on the following discussion index metadata specification 500 as depicted in FIG. 5A.

Contents 504 may include the type and type-specific information of the derived dataset that is useful in instantiating appropriate index interpretation logic, such as name, kind, configuration (e.g., indexed and included columns plus their types), content (e.g., physical location and layout).

Lineage 506 may include information used to track lineage of the derived dataset, e.g., HDFS data source being indexed, information needed to refresh the index with minimal information from the user, information needed to perform index/view selection, and descriptive history of an index. Lineage may also include information regarding any additional transformations applied to a data source or sources when building the index (e.g., a filter applied before indexing such as, for example, WHERE Coll IN ("user1", "user2") or similar).

State 508 may include state information pertaining to the derived dataset, e.g., global information such as Active and Disabled, and transient information such as Creating and Deleted.

FIG. 5A also includes an operation log 510. Operation log 510 is described in greater detail herein below in conjunction with a description of multi-user concurrency control.

FIG. 5B depicts an example instance of a covering index 502 described according to the example index metadata specification 500 of FIG. 5A, according to an embodiment. Those skill in the art will readily understand the great majority of the metadata of covering index 502. A first thing to note, however, all metadata is stored in easily readable JSON format, which reduces dependencies for an integration with a query engine, and that provides support for spec evolution through versioning fields. Also please note plan node 514 under source node 512. Plan node 514 further includes a rawPlan node 516 that is a property of plan node 514. RawPlan node 516 is the raw query plan information for covering index 502. For instance, in the case of Spark, rawPlan node 516 is the serialized representation of the logical plan.

Including the raw query plan information in rawPlan node 516 of covering index 502 offers a number of advantages. First, the raw query plan enables support for transparent index refreshes (e.g., by invoking the rebuild( ) API described above in relation to FIG. 4) without having the user provide the original query that was used when creating the index. Second, it allows a query engine to decide whether or not to utilize this index during optimization. For example, and recall that embodiments include multi-engine support, a query engine may examine the raw query plan for an index and discover that the index was created using an unsupported hash function and as a consequence omit that index from any optimized plans. Third, inclusion of the raw query plan is useful for debugging purposes.

Figure 6:
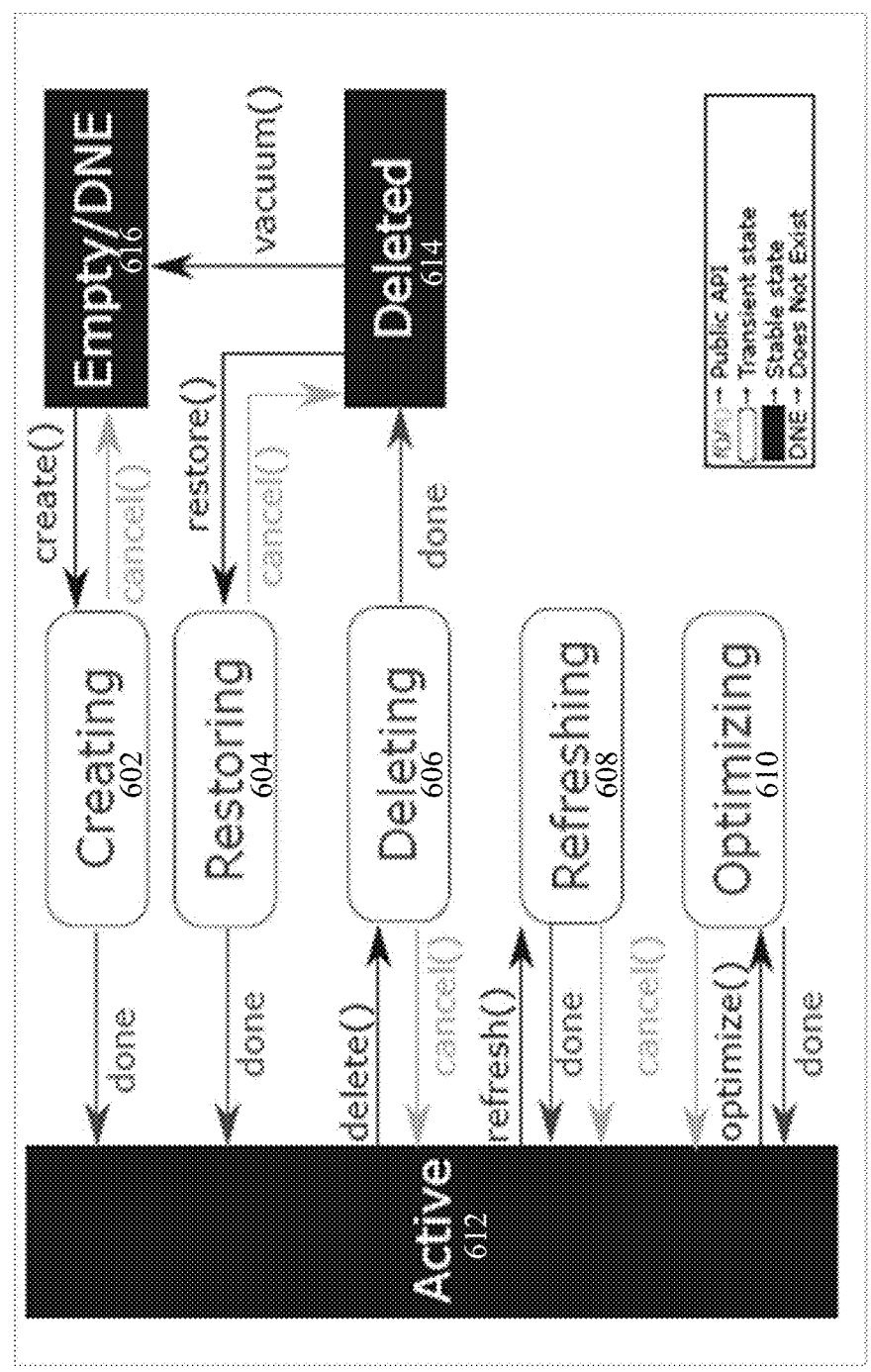
FIG. 6 depicts an example index state machine to support serverless stateful index operations, according to an embodiment.

Covering index 502 also includes a state node 518 which, as mentioned above, tracks the state of the index thereby enabling embodiments to be serverless. There are numerous ways of managing index state under a serverless paradigm. For example, FIG. 6 depicts an example index state machine 600 to support serverless stateful index operations, according to an embodiment. State machine 600 includes the following transient states: creating 602, restoring 604, deleting 606, refreshing 608, and optimizing 610. State machine 600 also includes the following stable states: active 612, deleted 614 and empty/DNE 616 (where 'DNE'='does not exist'). Other structural and operational embodiments will be apparent to persons skilled in the relevant art(s) based on the following discussion of index state machine 600 as depicted in FIG. 6.

Because embodiments are implemented in a serverless paradigm, there is of course no server to maintain or track index states. Accordingly, embodiments manage index states by according to the state transitions illustrated in index state machine 600 of FIG. 6. Note that states active 612, deleted 614 and empty/DNE 616 are stable states, whereas the other states are transitioning. These state transitions are described as follows:

Creating 602: Assuming no index exists, the state machine starts in state empty/DNE 616. When a user invokes the createIndex( ) API as described above in conjunction with FIG. 4, the index being created enters state creating 602 from state empty/DNE 616. If for some reason, while the index is still in state creating 602, the user cancels index creation by issuing the cancelIndex( ) API, then the index goes back to state empty/DNE 616.

Active 612: Once the index is created successful, the index transitions to state active 612 and becomes visible (the index is not visible when it is in state creating 602). An index ordinarily spends most of its time in state active 612.

Refreshing 608: An existing index may be refreshed/rebuilt via the rebuildIndex( ) API described above. Although the terms refresh and rebuild are basically used interchangeably herein, the term "refresh" is often applied an incremental rebuild. Note, refreshing does not block index visibility—consumers of the index may continue to access the current active copy of the index until refreshing is finished.

Deleting 606: A user can delete an index using the deleteIndex( ) API described above. During the delete operation, the index enters state deleting 606. As described above, a delete operation is a soft delete only (for the sake of speed) and has the effect of making the index invisible/unusable.

Deleted 614: Upon completion of the deleteIndex( ) call, the index enters state deleted 614.

Restoring 604: Because a delete is only a soft delete, a restoreIndex( ) command may restore the index at which point the index enters state restoring 604 and upon completion, the index again enters state active 612. Again, the index is not visible when it is in the Restoring state.

Optimizing 610: A user can further choose to optimize the index via an optimizeIndex( ) API. For example, one optimization is index compaction, where (small) index blocks generated incrementally are merged into larger ones to improve index read efficiency.

In a multi-user scenario, clearly some index states conflict with one another (i.e., the index cannot take on certain states for different users at the same time). For example, if an index is in state deleting 606, refreshing 608, or optimizing 610 in one user session, the cannot be in state restoring at the same time in another concurrent user session. This can be appreciated because the index can only move to deleting 606, refreshing 608, or optimizing 610 from active 612, whereas it can only enter restoring 604 from deleted 606. If two API calls can lead to conflicting index states, they are incompatible. Table 1 illustrates the compatibility matrix of APIs disclosed herein, and shows the API calls of one user (e.g., when reading across) that are incompatible with that of a second user (reading downward), where C=create, D=delete, O=optimize, RF=refresh, RS=restore and V=vacuum.

TABLE 1

| | | | | | | |
|---|---|---|---|---|---|---|
| Compatibility matrix of index management APIs | | | | | | |
| API | C | D | O | RF | RS | V |
| C | Y | N | N | N | N | N |
| D | N | Y | Y | Y | N | N |
| O | N | Y | Y | Y | N | N |
| RF | N | Y | Y | Y | N | N |
| RS | N | N | N | N | Y | N |
| V | N | N | N | N | N | Y |

Although Table 1 prevents an index from reaching incompatible states in two different user sessions, it cannot prevent two different users from attempting to make conflicting changes to the index. To address this problem, embodiments ensure the index consistency through optimistic concurrency control. As described above, embodiments implement an optimistic concurrency control scheme that utilizes the example log operations 700 according to FIG. 7. The example log operations 700 include a LogOp( ) 702, a Validate( ) 704, a Begin( ), 706, a RunOp( ) 708, Commit( ) 710 and a Commit Protocol 712. Such operations are performed using the operation log 510 of FIG. 5A, and are described herein below:

LogOp( )—records the index manipulation that a user is going to attempt to operation log 510

Validate( )—validates whether the index is in a suitable state that allows for the desired manipulation (e.g., one cannot delete an index that does not exist)

Begin( )—assigns an id to the index manipulation with the corresponding transitioning state RunOp( )—records to operation log 510 that the desired manipulation is now running Commit( )—records the id of the finished index manipulation to operation log 510, including the corresponding final stable state Commit( ) relies on the atomicity of renaming a file in a cloud file system (such as, e.g., HDFS, Azure Storage, or Azure Data Lake) to ensure that altering index state from a transitioning state to a stable state during Commit( ) is atomic. For example, if during a commit the file corresponding to the index transitioning state is renamed, the commit and transaction as a whole may be aborted (as depicted in commit protocol 712). The transaction may be attempted again later after receiving an abort message.

Figure 7:
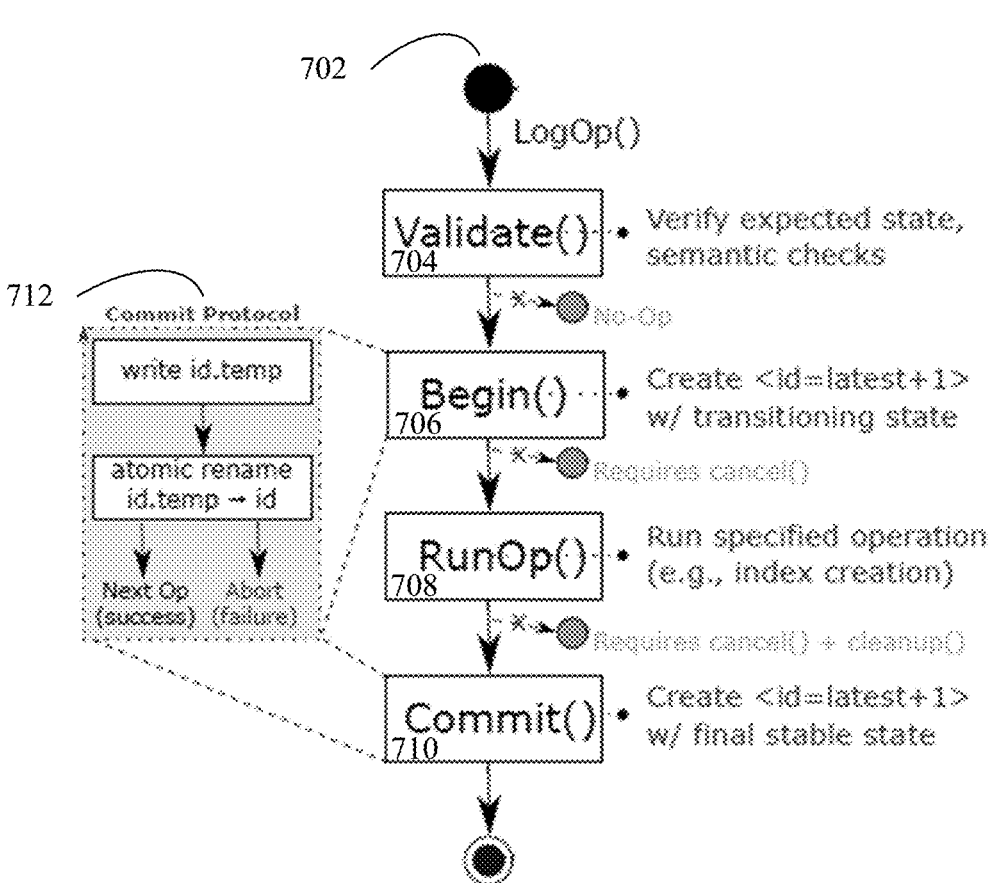
FIG. 7 depicts example log operations to support concurrency control of serverless multi-user index operations, according to an embodiment.
Figure 8:
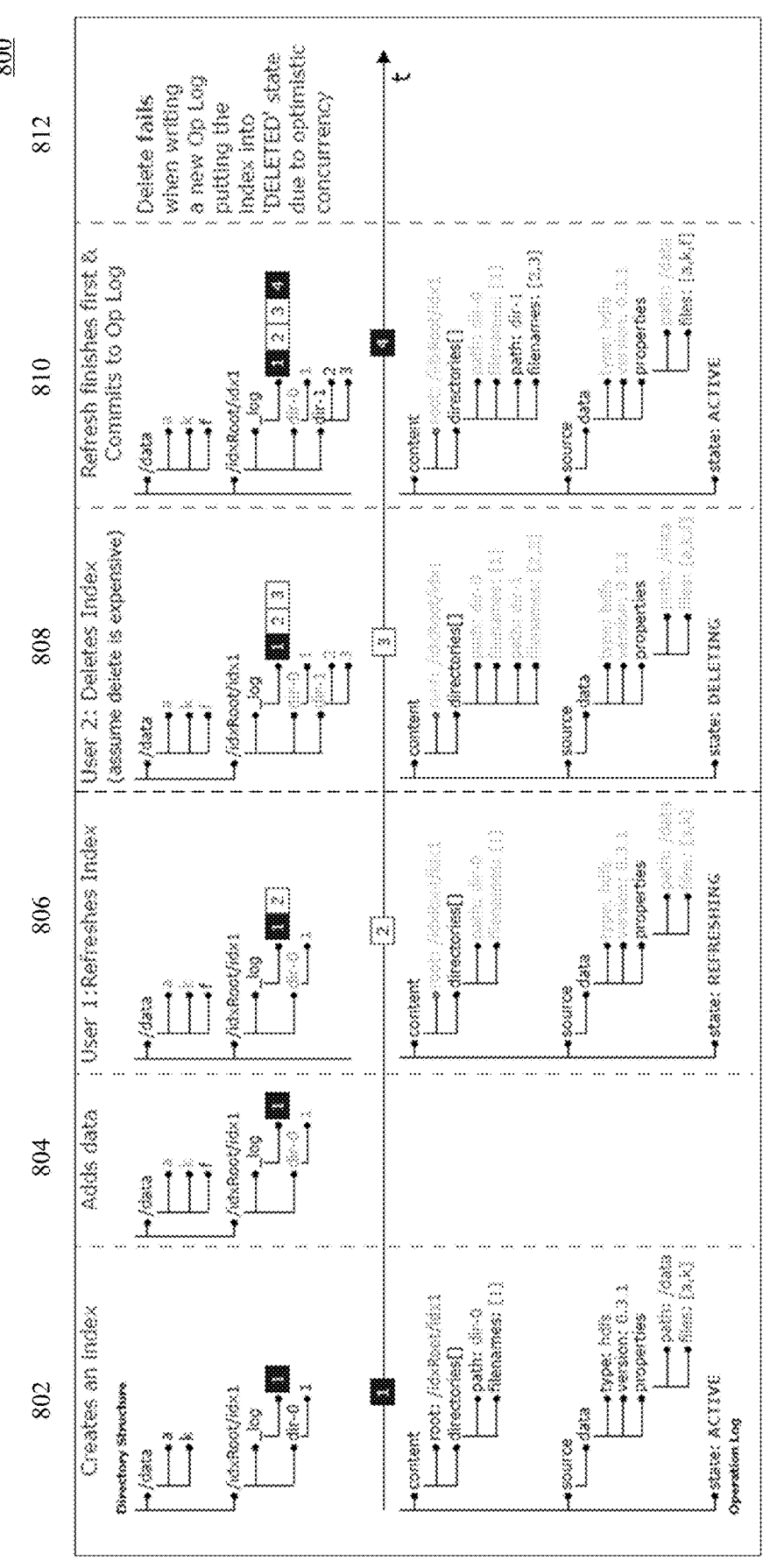
FIG. 8 depicts an example timeline illustrating use of the example log operations of FIG. 7 to manage concurrent index manipulations by two users, according to an embodiment.

An example transaction is illustrated in timeline 800 of FIG. 8 illustrating use of the example log operations of FIG. 7 to manage concurrent index manipulations by two users. Timeline 800 proceeds from left to right wherein, initially, an index is created at step 802, and data is added at step 804. At step 806, a user (User 1) tries to refresh an existing index. Near simultaneously, another user (User 2) tries to delete the same index at step 808. Assuming that the deletion is expensive (i.e., time consuming), the refresh from User 1 finishes first at step 810 successfully. When the deletion of User 2 attempts to commit, the log reflects the fact that the state of the index changed (due to the refresh of User 1), and the delete fails at step 812.

Embodiments are enabled to permit multiple writers using the above concurrency control mechanism, and multiple readers. For a reader of the index, any stable snapshot of the index data that has committed ordinarily suffices. To ensure consistency between the index and the corresponding data being indexed, embodiments may employ a signature-based mechanism whereby the latest timestamps of the data files are used to generate a signature (e.g., signature 520 as shown in FIG. 5A) for the index. As described more herein below, during query processing, it is possible that a query may touch a table as well as its indexes simultaneously. Using the signature of the data that is stored in the index metadata, the optimizer can ensure that the index is not stale. In a serverless regime, it is not generally possible to guarantee perfect external consistency. For example, it is possible that a query is accessing data that has been updated since the data was validated using signature 520 of the index, and there are no locks on the resources. Instead, external consistency has to be supported at the query engine level—i.e., external consistency can be supported only if the query engine can expose such an API.

The description set forth above provides a framework for indexes and a corresponding lifecycle API. Of course, such indexes are not useful unless they can be leverage at query time. Accordingly, the query optimizer of a query engine must be made aware of the existence and format of the indexes, and be enabled to properly process such indexes. As described in further detail herein below, embodiments lever indexes by incorporating new rules into Spark's rule-based query optimizer. In particular, Filter and Join Index Rules are defined, and may be used to optimize the query plan of a given query to use available indices. In the next section, we start by discussing the impact of indexes on query execution. We then present the details of the implementation and integration of indexing rules. Integration of indexing rules into other types of query optimizers, such as ones that follow the architectures of Starburst, Volcano, or Cascades would be similar.

As mentioned above, embodiments described herein focus on two workhorse Spark operators in query processing, filter and join, merely to illustrate the concepts (i.e., other operators, such as aggregations and group by, may also be optimized in a similar way). More specifically, embodiments implement two query optimizer rules, FilterIndexRule and JoinIndexRule, that target accelerating filter and join operators in Spark query execution plans using indexes as described herein above. Embodiments produce filter indexes that benefit filter operator performance by eliminating data partitions and by bucketizing (i.e., partitioning using a hash function) the index data by the indexed columns. Such indexes may, therefore, significantly reduce the amount of data to be accessed for filters with equality predicates (i.e., point lookups) that reference the indexed columns.

Such indexes may likewise benefit join operator performance where the indexed columns match join keys and the optimizer chooses to use a shuffle-based join (e.g., a hash join or sort-merge join). In such instances, the shuffle stage of the join can be completely avoided due to the bucketization of the index. It is well known that shuffle operations are expensive in distributed big data processing, and eliminating or minimizing such shuffles often provides a substantial performance benefit.

Although not described herein, such indexes may also be beneficial for other operators, such as aggregates on top of group-bys, among others. Herein below, we formally define FilterIndexRule and JoinIndexRule.

A FilterIndexRule works as follows: if a table scan has a filter f on top of it, we replace it by an index I if the following conditions meet:

The leading column in the indexed (key) columns of I is referenced by some predicate in f;

All columns referenced by predicates in f are covered by I, i.e., appear in either the indexed or included columns of I.

Consider an example, in FIG. 9, that illustrates an example application 900 by a query optimizer of a Filter Index Rule to a SQL query, according to an embodiment. Example application 900 assumes an input configuration 902 that includes tables 904, a query 906 and index 908. Indexes 908 include a single index, $F_1$. which is a Filter index. Index $F_1$ includes an indexed column <u>R.a</u> (i.e., R.a is a key column of index $F_1$ which is denoted by being underlined), and an included column, R.b. Having received query 906, a query optimizer may generate original query plan 912 in response. The indexing rule first searches the query plan for matches of the pattern Scan→Filter.

In original query plan 912 generated from query 906, there are two such matches:

(M1) Scan(R)→Filter(R.a=5);

(M2) Scan(S)→Filter(S.d>200).

For each match, the indexing rule directs the query optimizer to further examine whether there is an index that meets the condition and if so, replace the table scan by the corresponding index. In our example, only the match (M1) has such an index: index $F_1$ that is defined to have an indexed column equal to R.a. As a result, the scan operator on top of the table R is replaced by a scan operator on top of the index $F_1$ instead, resulting in optimized query plan 914.

The JoinIndexRule works in a similar manner by looking for candidate indexes via pattern matching. However, unlike the FilterIndexRule, it is not possible to match a specific pattern except for merely matching individual join operators. When a matching join operator is found, it is inspected to see if it satisfies the equi-join condition i.e., a join condition that is restricted to be a conjunction of equality predicates between join columns.

After matching an eligible join operator O with join condition c, the next step is to find usable indexes for O. Given that both the left and right sub-plans of a join are linear, there are only two base tables in the plan tree under O. For each base table T, the following conditions are checked for each candidate index I on top of T:

All join columns in T that are referenced by c should be the same as the indexed columns of I;

All other columns referenced by the left or right sub-plan that accesses T are contained by the included columns of I.

More formally, let $\mathcal{J}_\ell$ and $\mathcal{J}_r$ be the candidate indexes found for the left and right sub-plan, respectively. Indexes may be further pairs by performing the following compatibility test:

Consider an index $I_l \in \mathcal{J}_\ell$ and an index $I_r \in \mathcal{J}_r$. The pair of two indexes $(I_l, I_r)$ is compatible if the indexed columns $(K_{l1}, \ldots, K_{lm})$ of $I_l$ and the indexed columns of $(K_{r1}, \ldots, K_{rm})$ of $I_r$ are pairwise associative, i.e., each column pair $(K_{lj}, \ldots, K_{rj})$ appears in an equi-join predicate $K_{1j}=K_{rj}$. Note, $I_l$ and $I_r$ must have the same number of indexed columns.

The above described compatibility test may be understood by way of an example:

Consider the query:

SELECT A, D FROM T1, T2

WHERE T1.A=T2.B AND T1.C=T2.D

Suppose that we have two indexes $I_1$ ⟨(A,C);( )⟩ over $T_1$ and $I_2$ ⟨(B,D);( )⟩ over $T_2$. Then $(I_1, I_2)$ is compatible. If, instead of $I_2$, we have index $I'_2$ ⟨(D,B);( )⟩, then $(I_1, I'_2)$ is not compatible.

It is possible that more than one compatibility index pair exists. In one embodiment, the index pair that results in the least execution cost may be selected based on the following criteria:

If there exist compatible index pairs $(I_l, I_r)$ such that $I_l$ and $I_r$ have the same number of buckets, then pick the index pair with the largest number of buckets.

Otherwise, if no such index pair exists, then pick an arbitrary index pair from the eligible pairs.

These criteria are used for a few reasons. First, when two indexes have the same number of buckets, there is no shuffling when performing the (sort-merge) join. That is, if the number of buckets differ, one index gets reshuffled into the number of buckets equal to the other. Second, generally speaking a greater number of buckets may lead to better parallelism in join execution (assuming no resource constraint).

Finally, JoinIndexRule replaces the scan operators on top of the tables by scan operators on top of the corresponding indexes in the best compatible index pair. For example, consider FIG. 10 which illustrates an example application 1000 of a JoinIndexRule to a SQL query, according to an embodiment. Example application 1000 includes input configuration 1002 which is based on configuration 902 of FIG.

9. In particular, input configuration 1002 includes table 904 and query 906 from FIG. 9. Input configuration 1002 also includes indexes 1008 which is based upon indexes 908 of FIG. 9, but which now includes two Join indexes $J_1$ and $J_2$.

Application of the JoinIndexRule then proceeds per the description herein above. In particular, because there are now two Join indexes $J_1$ and $J_2$, query plan 912 may inspected for eligible join operators. Here, query plan 912 includes the join operator 1010 with the join condition R.b=S.c. Next, the left and right sub-plans of the join are inspected for candidate indexes. We find index $J_1$ is applicable to the left sub-plan (due to the presence of column R.a in filter operation 1012) and index $J_2$ to the right sub-plan (due to the presence of column S.d in filter operation 1016). Clearly, $(J_1, J_2)$ is the unique compatible candidate index pair. As a result, the scan operators on top of table R and table S may be replaced by scan operators on top $J_1$ and $J_2$, respectively, resulting in optimized query plan 1014.

As described above, the FilterIndexRule and JoinIndexRule define rules that permit a query engine to optimize a query plan to take advantage of corresponding indexes. The use of such rules must, however, be integrated into the query engine. As mentioned above, embodiments herein are described in terms of the Spark query engine (aka, Catalyst). As a rule-based query optimizer, integrating these rules is straightforward and mainly consists of incorporating the indexing rules into the rules employed by the optimizer, there are two decisions that need to be made: where to include the new rules, and in what order to apply the new rules.

Where to include the rules? Having the new rules in the wrong place may lead to unexpected consequences due to potential interactions and side effects between the rules. Embodiments described herein, however, merely replace base tables by eligible indexes which has no effect on downstream operators in the logical plan. Accordingly, the new rules may be applied after all other optimizer rules (i.e., after the query optimizer has otherwise completed the logical query plan).

What is the order of the rules? Because the FilterIndexRule and JoinIndexRule each are applied after all other rules, the order is somewhat arbitrary and may be done in either order. However, embodiments may benefit from putting the JoinIndexRule before the FilterIndexRule because one may expect that the index for a join may lead to more improvement.

Having described the architecture of the indexing subsystem, lifecycle management of indexes, and usefully leveraging such indexes in a query, description turns herein below to the question of: given a known workload of queries, what index(es) would be most beneficial to create?

Embodiments described herein below provide an index recommendation framework that operates in two major steps:

1) Candidate Generation—Candidate indexes are generated based on the characteristics of the query workload; and 2) Selection of the best indexes—The best indexes of the candidate indexes are selected using either a rule-based approach, or a cost-based approach.

whereby, given a workload of queries, a set of candidate indexes is created, and the best indexes of that set are selected and recommended for building (or, alternatively, automatically built).

Figure 11:
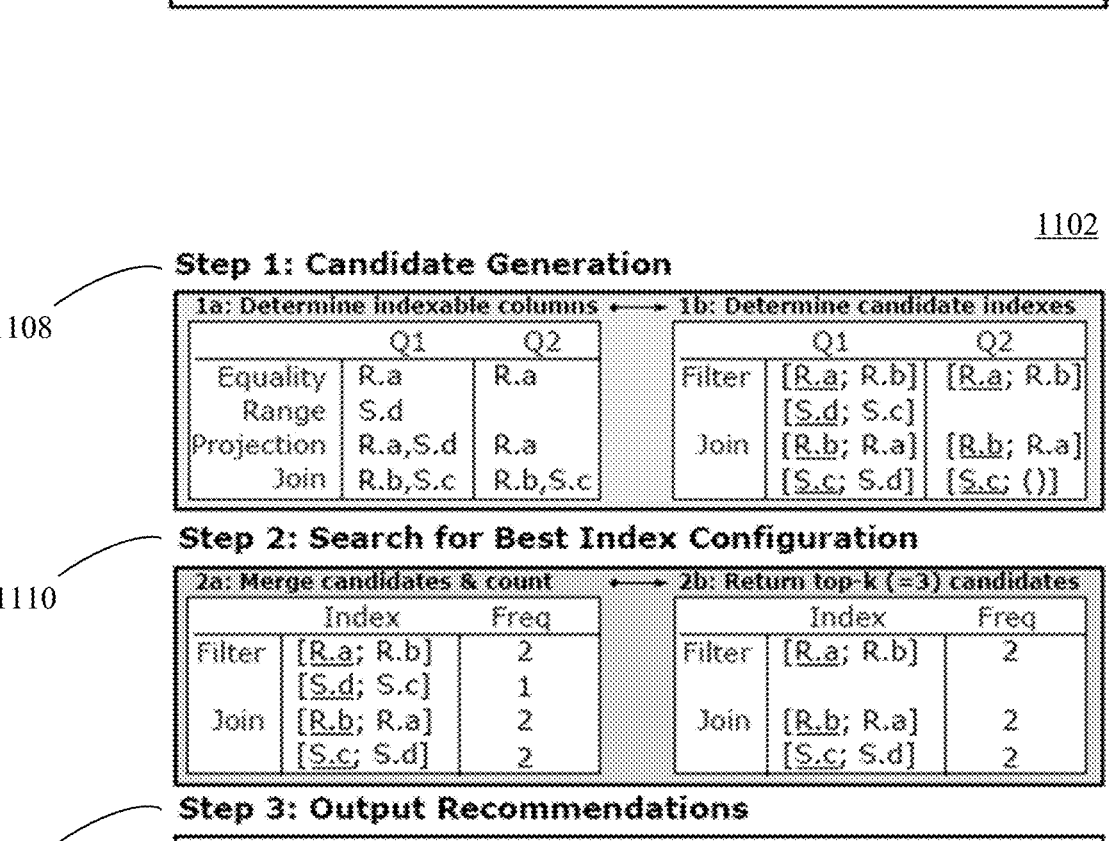
FIG. 11 depicts an example workload and example steps for generating index recommendations for that workload, according to an embodiment.

This two-step process is further explored with reference to FIG. 11 which depicts an example workload 1100 and example steps 1102 for generating index recommendations for workload 1100. Workload 1100 includes queries 1104 which includes query Q1 and query Q2. Also depicted with workload 1100 is the data source being queried shown in the form of tables 1106. Example steps 1102 include steps 1108-1112 directed to Step 1: candidate generation, Step 2: search for the best index configuration and Step 3: output of recommendations, respectively. Step 1108 includes substeps 1a and 1b. Likewise, Step 1110 includes substeps 2a and 2b. Other structural and operational embodiments will be apparent to persons skilled in the relevant art(s) based on the following discussion example steps 1102 as depicted in FIG. 11.

The main idea of candidate generation a step 1108 of FIG. 11 is the following:

1. Each query of workload 1100 is inspected to determine indexable columns (e.g., at step 1a); and
2. Candidate indexes are constructed using the a (e.g., at step 1b).

In an embodiment, candidate generation may proceed according to Algorithm 1 shown herein below:

---

Algorithm 1

---

```
    Input: 𝒲 = {q₁, . . . , qₙ}: a workload of queries
    Output: 𝒥 = { I₁, . . . , Iₙ}: candidate indexes.
 1:  Main:
 2:  // Stage 1 – Generate all 'indexable columns'
 3:  foreach q ∈ 𝒲 do
 4:  |    q.ε ← {c|c ∈ equality predicates of q};
 5:  |    q.ℛ ← {c|c ∈ range predicates of q};
 6:  |    q.𝒥 ← {c|c ∈ equi-join predicates of q};
 7:  |    q.𝒲 ← {c|c ∈ group-by lists of q};
 8:  |    q.𝒫 ← {c|c ∈ projection lists of q};
 9:  |    q.𝒞 ← q.ε ∪ q.ℛ ∪ q.𝒥 ∪ q.𝒲 ∪ q.𝒫 ;
10:  //Stage 2 – Generate candidate indexes;
11:  𝒥 ← ∅;
12:  foreach q ∈ 𝒲 do
13:  |    (table T, T.𝒞 ) ← Group q.𝒞 by tables;
14:  |    foreach (table T, T.𝒞 ) do
15:  |    |    //Generate an index targeting filter;
16:  |    |    I_filter ← GenerateFilterIndex(T, T.𝒞 );
17:  |    |    𝒥 ← 𝒥 ∪ {I_filter};
18:  |    |    //Generate index targeting joins;
19:  |    |    I_join ← GenerateJoinIndex(T, T.𝒞 );
20:  |    |    𝒥 ← 𝒥 ∪ {I_join};
21:  return 𝒥 ;
22:
23:  GenerateFilterIndex(T, T.𝒞 ):
24:  T.𝒮 ← T.ε + T.ℛ ;
25:  I.indexedCols ← T.𝒮 ;
26:  I.includedCols ← T.𝒞 – T.𝒮 ;
27:  return I;
28:
29:  GenerateJoinIndex(T, T.𝒞 ):
30:  I.indexedCols ← T.𝒥 ;
31:  I.includedCols ← T.𝒞 – T.𝒥 ;
32:  return I;
```

---

Algorithm 1 is described with continued reference to candidate generation step 1108 of FIG. 11. Embodiments may be configured to determine different types of indexable columns as known in the art. In one particular embodiment, Algorithm 1 extracts the following indexable columns from a query q:

ε—columns appearing in equality predicates (i.e., x=a where x is a column and a is a constant) of q (line 4 of Algorithm 1);

ℛ—columns appearing in equality predicates (i.e., x≤a or x≥a where x is a column and a is a constant) of q (line 5 of Algorithm 1);

𝒥—columns appearing in equi-join predicates (i.e., R.x=S.y where R and S are tables) of q (line 6 of Algorithm 1);

𝒢—columns appearing in group-by lists (i.e., GROUP BY x₁, . . . , xₘ) of q (line 7 of Algorithm 1);

𝒫—columns appearing in projection lists (i.e., SELECT x₁, . . . , xₘ) of q (line 8 of Algorithm 1)

The set of indexable columns 𝒞 of q is simply the union of the above sets of columns (and as reflected by line 9 of Algorithm 1).

Having enumerated the indexable columns at lines 3-9 of Algorithm 1, candidate indexes for each query $q_i$ of the workload 𝒲 are generated from the indexable columns at lines 13-21 of Algorithm 1, a description of which follows herein below.

To construct candidate indexes from the indexable columns, the indexable columns are grouped together by their corresponding tables (accessed by the query) on line 13. Algorithm 1 then loops over each such group of indexable columns that correspond to a particular table and generates candidate indexes for each at lines 15-20.

In particular, one or more indexes are created for indexable columns corresponding to filters (line 16 of Algorithm 1) and indexes for indexable columns corresponding to joins (line 19 of Algorithm 1) if any.

The candidate indexes corresponding to filters are denoted as $I_{filter}$ at line 16, wherein each candidate index therein includes indexed columns and included columns. The indexed columns are formed by the concatenation of the equality filtering columns in ε with the range filtering columns in ℛ, whereas the remaining indexable columns form its included columns (as shown in the helper function GenerateFilterIndex( ) at lines 24 to 26 of Algorithm 1). The candidate indexes corresponding to joins are denoted as $I_{join}$ at line 19, and like the filter indexes, each candidate index includes indexed columns and included columns. The equi-join columns in 𝒥 form the indexed columns, whereas the remaining indexable columns form its included columns (as shown in the helper function GenerateJoinIndex( ) at lines 30 to 31 of Algorithm 1).

Upon completion of Algorithm 1, step 1108 of FIG. 11 is likewise complete, and embodiments next must determine which index configuration is best. To select the best indexes from the set of index candidates 𝒥 returned by Algorithm 1, one approach is to enumerate all subsets of 𝒥 and find the subset that leads to the best improvement over the workload 𝒲 in terms of query execution time. This approach, however, may not be feasible in practice when is 𝒥 large. Accordingly, embodiments disclosed herein apply heuristic approaches.

The first such heuristic approach is a rule-based approach whereby deterministic statistics for the candidate indexes are compared. In particular, embodiments may implement a frequency-based approach as shown in Algorithm 2 herein below:

---

Algorithm 2

---

```
    Input:   𝒲 = {q₁, . . . , qₙ}: a workload of queries
             𝒥 = { I₁, . . . , Iₙ}: candidate indexes from Algorithm 1
             K: the number of indexes to be returned
    Output: The best K indexes from 𝒥 .
 1:  // Step 1: Count;
 2:  foreach I ∈ 𝒥 do
 3:  |    foreach q ∈ 𝒲 do
 4:  |    |    if I is a candidate index from q then
```

-continued

| Algorithm 2 |
| --- |
| 5:  $\mid$   $\mid$   $\mid$  I.freq ← I.freq + 1; |
| 6:  //Step 2: Merge |
| 7:  $\mathcal{J}$ best ← Ø; |
| 8:  Group index in $\mathcal{J}$ by their indexed columns; |
| 9:  foreach (indexed column K, index group $\mathcal{J}_K$) do |
| 10:  $\mid$    //Merge the indexes into one single index $I_{merged}$; |
| 11:  $\mid$    $I_{merged}$.indexedCols ← K; |
| 12:  $\mid$    $I_{merged}$.includedCols ← $\cup_{I \in \mathcal{J}_K}$ K; |
| 13:  $\mid$    $I_{merged}$.freq ← $\Sigma_{I \in \mathcal{J}_K}$ I.freq; |
| 14:  //Step 3: Rank |
| 15:  Sort $\mathcal{J}_{best}$ by decreasing order of I.freq for I ∈ $\mathcal{J}$; |
| 16:  return The top K indexes in the ordered $\mathcal{J}_{best}$ |

Algorithm 2 may be summarized as three steps as follows:
1. Count index frequency (lines 2-5), where we count the number of appearances of each candidate index in the workload of queries;
2. Merge candidate indexes (lines 7 to 13), where we merge indexes with the same indexed column into one single index by combining their included columns; and
3. Rank merged indexes (line 15), where we sort the merged indexes by the decreasing order of their frequencies.

Algorithm 2 then returns the top K indexes from the ordered candidates (at line 16), where K is a pre-determined given by the user.

Though the frequency-based often provides good index recommendations, the approach may not be ideal for all workloads. First, just because a candidate index would be used frequently by the queries of a workload does not necessarily mean that the index provides a large reduction in query execution time. For example, such an index might be over a frequently accessed and small reference (i.e., dimension) table having a negligible access time. Second, while merging candidate indexes with the same indexed columns has the advantage of reducing index storage and maintenance overhead, it may be difficult to measure the efficacy without proper understanding of the overhead. To address these and other issues, embodiments may instead employ a cost-based approach that relies on modeling the query execution cost.

One embodiment of a cost-based approach to index selection relies on several basic building blocks:
1. A cost model that estimates the execution cost of a given query plan;
2. A "what if" utility that returns the hypothetical query plan and its cost without actually building the indexes; and
3. An efficient search algorithm that looks for the indexes that result in minimum workload execution cost.

Figure 12A:
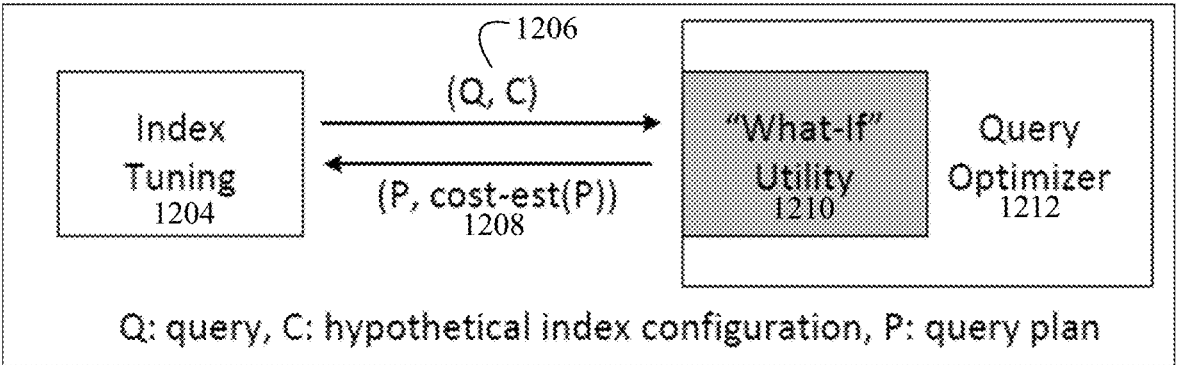
FIG. 12A depicts an architectural overview of cost-based index tuning using a "what if" utility, according to an embodiment.

FIG. 12A depicts an architectural schematic 1200 of cost-based index tuning using a "what if" utility 1210, according to an embodiment. Schematic 1200 includes an index tuning module 1204 and a query optimizer 1212 that includes a "what-if" utility 1210. Other structural and operational embodiments will be apparent to persons skilled in the relevant art(s) based on the following discussion regarding schematic 1200 as depicted in FIG. 12A.

At a high level, the cost-based approach embodied by schematic 1200 of FIG. 12A works as follows. Index tuning module 1204 provides the ordered pair 1206 comprising a query q and a hypothetical index configuration C to "what-if" utility 1210. The hypothetical index configuration may include a set of candidate indexes as described herein above.

"What-if" utility 1210 may, in conjunction with query optimizer 1212, generate the ordered pair 1208 that comprises a query plan P, and an estimated cost for executing plan P (denoted as 'cost-est(P)' in FIG. 12A). The query plan P is the plan generated by the query optimizer assuming that the indexes of configuration C have in fact been built. Likewise, the cost estimate cost-est(P) reflects an estimate of the execution cost of plan P. More detailed description of this high-level overview is included herein below in the context of FIG. 12B which depicts an example 1202 application of "what if" utility 1210 to a SQL query, according to an embodiment. Example 1202 includes tables 1214, a SQL query 1216, filter index $F_1$ 1218, plan P 1220, plan P' 1222, cost R 1224 and cost R' 1226. Other structural and operational embodiments will be apparent to persons skilled in the relevant art(s) based on the following discussion "what-if" utility 1210 as depicted in FIG. 12.

Figure 12B:
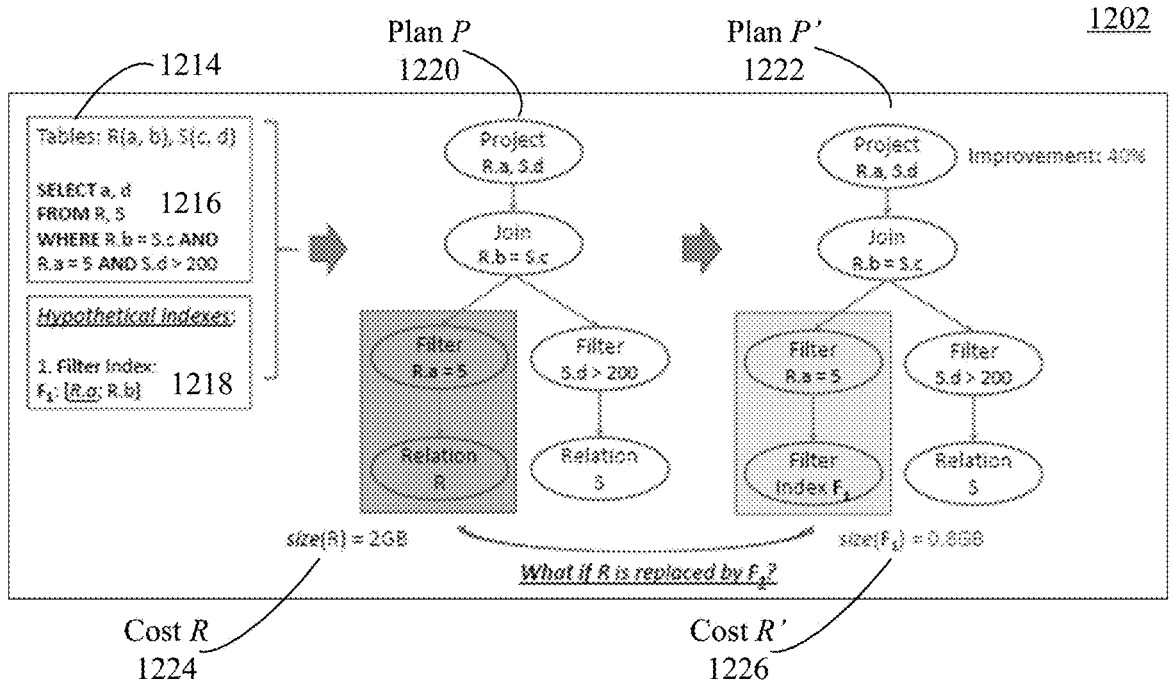
FIG. 12B depicts an example application of the "what if" utility to a SQL query, according to an embodiment.

As shown in FIG. 12B the data source has two tables 1214 to be queried: R(a, b) and S(c, d), and query 1216 is a simple filter-join query applied to them. Suppose that the user wants to understand the performance impact on query 1216 by building index $F_1$ 1218. In an embodiment, the user may invoke "what if" utility 1210 without building index $F_1$ 1218. Such an invocation generally proceeds as follows:
1. The plan P 1220 returned by query optimizer is received, and filter predicates are searched for that can be evaluated using index $F_1$ 1218.
2. Index $F_1$ 1218 is determined as beneficial for accelerating the processing of the filter R.a=5.
3. The table scan on R is replaced by accessing the "hypothetical" filter $F_1$ 1218, and a new plan P' 1222 is generated. Plan P' 1222 is not executable (because filter $F_1$ 1218 has yet been built).
4. The cost estimation procedure is invoked on new plan P' 1222 and its estimated cost is generated. (Again, this cost is imaginary and makes sense if $F_1$ were is built).

To determine the cost P, a cost model may be applied to plan P 1220. For example, suppose the cost model is configured to estimate the output size of each operator. Suppose that the size of table R is 2 GB meaning that a table scan over R incurs the cost retrieving and processing 2 GB (denoted as cost R 1224). The cost model employed by "what-if" utility 1210 may determine, on the other hand, that when the table scan of R is replaced by index $F_1$ 1218, then the size can be reduced to 0.8 GB which is cost R' 1226 as shown in FIG. 12B.

In this fashion, a cost model may estimate the output size of all the operators in plan P 1220 and likewise to the operators in plan P' 1222, sum the respective costs and determine an estimated cost for executing each plan. Having done so, one may now compare the cost of plan P 1220 and plan P' 1222, and compute the improvement. For the example here, assume cost(P)=size(P)=2.5 GB, and cost(P') =size(P')=1.5 GB, which are the sum of the output sizes of all operators in plan P 1220 and plan P' 1222 respectively. As a result, the improvement would be $$\frac{\text{cost}(P) - \text{cost}(P')}{\text{cost}(P)} = 40\%$$

if index $F_1$ 1218 were built. Algorithm 3 shown herein below illustrates an embodiment of "what if" utility 1210:

---

Algorithm 3: "what if" utility

---

Input: q: a query
        $\mathcal{I}$: a set of hypothetical indexes
Output: cost(q): estimated cost if $\mathcal{I}$ was built.
1:  Main:
2:  P ← PlanByOptimizer(q);
3:  P' ← ReplaceScansByHypotheticalIndexes(P, $\mathcal{I}$);
4:  cost(P') ← EstimateCost(P');
5:  return cost(P');
6:
7:  ReplaceScansByHypotheticalIndexes(P, $\mathcal{I}$):
8:  foreach hypothetical index I $\epsilon$ $\mathcal{I}$ do
9:  |     if I can be matched by FilterIndexRule or
             JoinIndexRule over P then
10:  |    |    Replace the corresponding scan in P by I;
11:  Return the plan P' after replacement;

---

There are various ways by which a cost model may estimate the query cost of a plan. In a size-based cost model as outlined above, one may rely on metadata stored in file system to obtain sizes for base table/index files. In the example described above in conjunction with FIG. 12, the sizes of both R and index $F_1$ 1218 may be obtained in this way. Estimating the output size of other operators may generally be accomplished by estimating the cardinality and/or selectivity of the operators (e.g., estimating the fraction of rows in a table that meet the conditions of a predicate filter). Selectivity of operators may be determined gather statistics regarding the workload and use compact data structures (e.g., histograms, sketches, random samples) to summarize the statistics. However, gathering statistics over large data is time-consuming. Moreover, it may be difficult to maintain such statistics to prevent them from becoming stale due to data updates.

Alternatively, heuristics may be employed whereby selectivity values are assigned to operators. For example, for operators whose output sizes are the same of their input sizes, such as a sort, their selectivity is simply 1.0; for other operators such as filter or join, their selectivity may be set as 0.1.

It should be noted that the exact value of the cost estimate generated by a cost model is not terribly important for the purposes of "what-if" utility 1210. That is, having a true and accurate cost estimate is not as important as the comparability of any two estimates. It suffices if a cost model can accurately determine which of two query plans has the higher cost.

Having provided a high-level description of "what-if" utility 1210 in the context of architectural schematic 1200 of FIG. 12A, description now turns to a detailed description of an embodiment of a cost-based approach to index selection using "what-if" utility 1210. It should be noted, however, that "what if" utility 1210 has its own benefits beyond its role in index recommendation. Using "what if" utility 1210, users are able to assess the potential improvement of building a hypothetical index quantitatively, e.g., in terms of percentage. Such benefits, however, do not come for free—they lead to more accurate cost modeling and therefore increased overhead when collecting statistics.

Algorithm 4 implements one embodiment of the cost-based approach to index selection utilizing, for example, "what if" utility 1210 as embodied by Algorithm 3, and as shown herein immediately below:

---

Algorithm 4

---

Input:  $\mathcal{W} = \{q_1, \ldots, q_n\}$: a workload of queries;
        $\mathcal{I} = \{ I_1, \ldots, I_n \}$: candidate indexes from Algorithm 1;
        K: the number of indexes to be returned.
Output: The best K indexes from $\mathcal{I}$.
1:  bestIndexes ← $\varnothing$;
2:  minCost ← $\Sigma_{i=1}^{n}$ optimizerCost($q_i$);
3:  foreach subset $\mathcal{S} \subseteq \mathcal{I}$ up to size K do
4:  |  cost($\mathcal{W}$, $\mathcal{S}$) ← $\Sigma_{i=1}^{n}$ whatIf($q_n$, $\mathcal{S}$) by Algorithm 3;
5:  |  if cost($\mathcal{W}$, $\mathcal{S}$) ← minCost then
6:  |  |  bestIndexes ← $\mathcal{S}$;
7:  |  |  minCost ← cost($\mathcal{W}$, $\mathcal{S}$);
8:  return bestIndexes;

---

Algorithm 4 accepts as input a workload of queries $\mathcal{W}$, a set of candidate indexes $\mathcal{I}$ as enumerated by Algorithm 1, and the number of indexes K to return. Each subset up to size K is enumerated (at line 3), and for each such subset $\mathcal{S}$, "what if" utility 1210 is invoked to obtain estimated cost of each $q_i \in \mathcal{W}$ as if the hypothetical indexes in $\mathcal{S}$ were built (line 4). If the sum of the estimated cost cost($\mathcal{W}$, $\mathcal{S}$) for the workload W is lower than the lowest cost currently recorded, we mark S as the best indexes and update the lowest cost so far (lines 5 to 7). Finally, the overall best subset found with the minimum estimated cost is returned (line 8). Note, summing the costs returned by the invocations of whatIf($q_n$, $\mathcal{S}$) as shown at line 4 is just one example of combining query costs to compute the workload cost. In an alternative embodiment, for example, one may further assign a weight (e.g., with respect to the frequency) to each query and thereafter compute a "weighted sum" when combining the query costs.

Figure 13:
FIG. 13 depicts a detailed schematic view of a workload optimization system, according to an embodiment.

Embodiments of a workload optimization system may be implemented in various ways to use the information derived from the queries of a workload to generate index recommendations that would benefit the workload, and to build and use such indexes for servicing the queries. For example, FIG. 13 depicts a detailed schematic view 1300 of a workload optimization system 1302, according to an embodiment. As shown in FIG. 13, workload optimization system 1302 includes a candidate index generator 1304, an index selector 1308 and a query processor 1312. Other structural and operational embodiments will be apparent to persons skilled in the relevant art(s) based on the following discussion regarding workload optimization system 1302 as depicted in FIG. 13.

As an initial matter, and as described above, workload optimization system 1302 as shown in FIG. 13 is configured to receive workload 1104 which comprises a plurality of queries, and to pass workload 1104 to candidate index generator 1304. Candidate index generator 1304 is configured to extract sets of indexable columns from the queries of workload 1104 in numerous ways. In an embodiment, for example, indexable columns may be extracted from the queries of workload 1104 per Algorithm 1 as described herein above. Candidate index generator 1304 is further configured to thereafter generate a set of candidate indexes 1306 based on the sets of indexable columns. For example, candidate indexes 1306 may be generated from the sets of indexable columns per Algorithm 1.

The generated candidate indexes 1306 are thereafter passed to index selector 1308. Index selector 1308 is configured to select which index or indexes of candidate indexes 1306 would provide the greatest performance benefit when executing the queries of workload 1104, and to provide such selected indexes to query processor 1312. Index selector

1308 may select the best indexes in a number of ways. For example, index selector 1308 may employ a frequency-based approach as set forth in Algorithm 2, and as described above. Alternatively, index selector 1308 may employ a cost-based approach utilizing the "what-if" utility 1210 of FIG. 12 to determine which indexes have the lowest cost. For example, index selector 1308 may employ an embodiment of "what-if" utility 1210 that implements Algorithm 3 as described above. Further, index selector 1308 may thereafter employ Algorithm 4 to select the best indexes using "what-if" utility 1210, and the manner described above herein. Index selector 1308 thereafter passes selected indexes 1310 to query processor 1312.

Query processor 1312 is configured to accept selected indexes 1310, to build the indexes included in selected indexes 1310 to provide built indexes 1314, to receive a query 1316, to generate a query plan optimized to use one or more of built indexes 1314, and to execute the query plan to produce a query result. For example, built indexes 1314 may be built from selected indexes 1310 by building a table including one or more key columns (i.e., the "indexed columns" as described in detail herein above in the description of Algorithm 1), and one or more data columns corresponding to the "included columns."

After receiving query 1316, query processor 1312 is configured to generate a query plan for the query wherein, wherever possible, the query plan is modified to reference one or more of built indexes 1314 by using the FilterIndexRule and JoinIndexRule, and in the manner described above in conjunction with FIGS. 9 and 10. Query processor 1312 may thereafter execute the modified query plan to produce the final query result.

Further operational aspects of workload optimization system 1302 of FIG. 13 is described in conjunction with FIG. 14 which depicts a flowchart 1400 of a of a method for workload optimization performed at a first query engine in a distributed query processing system, according to an embodiment. In an embodiment, flowchart 1400 may be performed by workload optimization system 1302 of FIG. 13. Although described with reference to workload optimization system 1302 as shown in FIG. 13, the method of FIG. 14 is not limited to that implementation. Indeed, as described further herein below, flowchart 1400 may likewise be performed by workload optimization system 1602 of FIG. 16. Other structural and operational embodiments will be apparent to persons skilled in the relevant art(s) based on the following discussion regarding flowchart 1400 of FIG. 14.

Note that flowchart 1400 may be triggered to optimize a distributed query processing system workload in various ways. For example, optimization may be triggered in response to an express request from a system administrator or automatically (e.g., based on changes to the average system workload over time, or substantial changes to the underlying data). Flowchart 1400 begins at step 1402. In step 1402, a set of candidate indexes are generated based on a plurality of queries. For example, and with reference to workload optimization system 1302 of FIG. 13, candidate index generator 1304 may be configured to generate candidate indexes 1306 based on the sets of indexable columns extracted from a workload comprising a plurality of queries in the manner described in detail above regarding workload optimization system 1302 of FIG. 13, the detailed description of FIG. 11, and Algorithm 1 and its detailed description, in an embodiment. Flowchart 1400 continues at step 1404.

At step 1404, a predetermined number of candidate indexes are selected from the set of candidate indexes based on a determination of an estimated performance improvement provided by the set of candidate indexes to performance of the workload. For example, and with continued reference to workload optimization system 1302 of FIG. 13, index selector 1308 may be configured to select a predetermined number of candidate indexes 1310 from the set of candidate indexes 1306 based on an estimated performance improvement the selected set provides to the performance of the workload. More specifically, index selector 1308 may operate in the manner described in detail above regarding workload optimization system 1302 of FIG. 13, Algorithm 2, or Algorithm 3 in conjunction with Algorithm 4, and their respective detailed descriptions. Flowchart 1400 continues at step 1406.

At step 1406, an index of the selected candidate indexes is built according to an index specification and stored at a predetermined location on the data lake, the predetermined location and index metadata included in the built index conforming to the index specification. For example, and with continued reference to workload optimization system 1302 of FIG. 13, query processor 1312 may be configured to accept selected indexes 1310 from index selector 1308 and to build such indexes to provide built indexes 1314 in the manner described above regarding workload optimization system 1302 of FIG. 13, and/or as known in the art. Moreover, such indexes may conform to index specification 212, and thereby include metadata such as contents 504 and lineage 506 as described in detail herein above. By dint of conforming to index specification 212, such indexes may likewise be stored at the predetermined default location as specified in index specification 212. Flowchart 1400 continues at step 1412.

At step 1408, a query is received. For example, and with continued reference to workload optimization system 1302 of FIG. 13, query processor 1312 may receive query 1316 which may comprise a query of workload 1104 or any other query. Flowchart 1400 continues at step 1410.

In step 1410, a query plan for the query is generated, wherein the query plan is optimized to use the built index. For example, and with continued reference to workload optimization system 1302 of FIG. 13, query processor 1312 may be configured to generate an intermediate query plan that is not configured to use any of the built indexes, and thereafter apply a FilterIndexRule and/or JoinIndexRule to the intermediate query plan to provide a query plan that is configured to use at least one of the built indexes as described in detail above regarding workload optimization system 1302 of FIG. 13, FilterIndexRule and/or JoinIndexRule being as described in conjunction with examples 900 and 1000 of FIGS. 9 and 10, respectively.

Flowchart 1400 of FIG. 14 concludes at step 1412. In step 1412, the query plan is executed to generate a final query result. For example, and with continued reference to workload optimization system 1302 of FIG. 13, query processor 1312 may be configured to execute the query plan generated in step 1414 to generate query result 1318. As known in the art, because the query plan was configured to use at least one of built indexes 1314, generating query result 1318 requires fewer system resources (e.g., storage space, CPU cycles and/or memory) than executing the above described intermediate query plan that is not configured to use built indexes 1314.

In the foregoing discussion of steps 1402-1412 of flowchart 1400, it should be understood that at times, such steps may be performed in a different order or even contemporaneously with other steps. For example, once at least one index is built at step 1406, embodiments may perform steps 1408-1412 while the system continues to build other indexes of the predetermined number of candidate indexes. Other operational embodiments will be apparent to persons skilled in the relevant art(s). Note also that the foregoing general description of the operation of workload optimization system 1302 of FIG. 13 is provided for illustration only, and embodiments of workload optimization system 1302 may comprise different hardware and/or software, and may operate in manners different than described above. Indeed, steps of flowchart 1300 may be performed in various ways.

Figure 15:
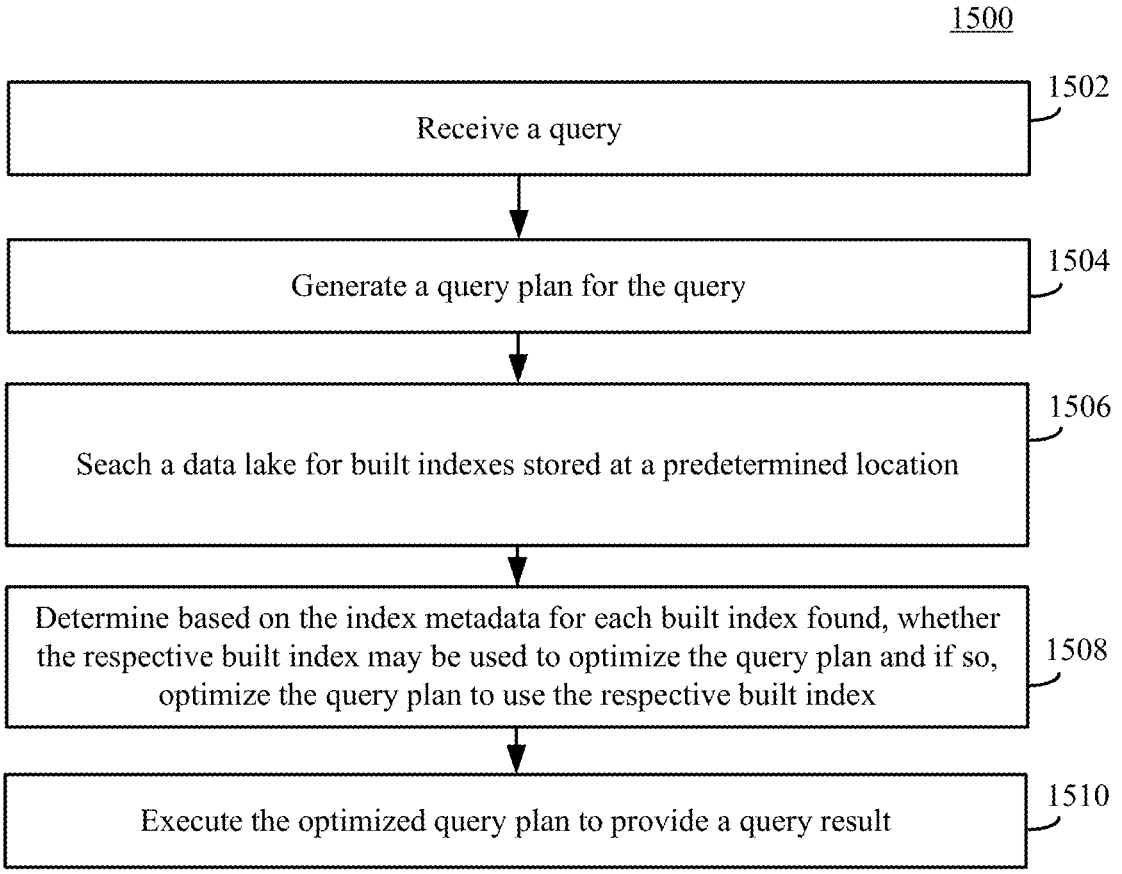
FIG. 15 depicts a flowchart of a multi-engine refinement to the flowchart of FIG. 14, wherein a second query engine optimizes a query plan to utilize a pre-existing index discovered at a pre-determined location, according to an embodiment.
Figure 16:
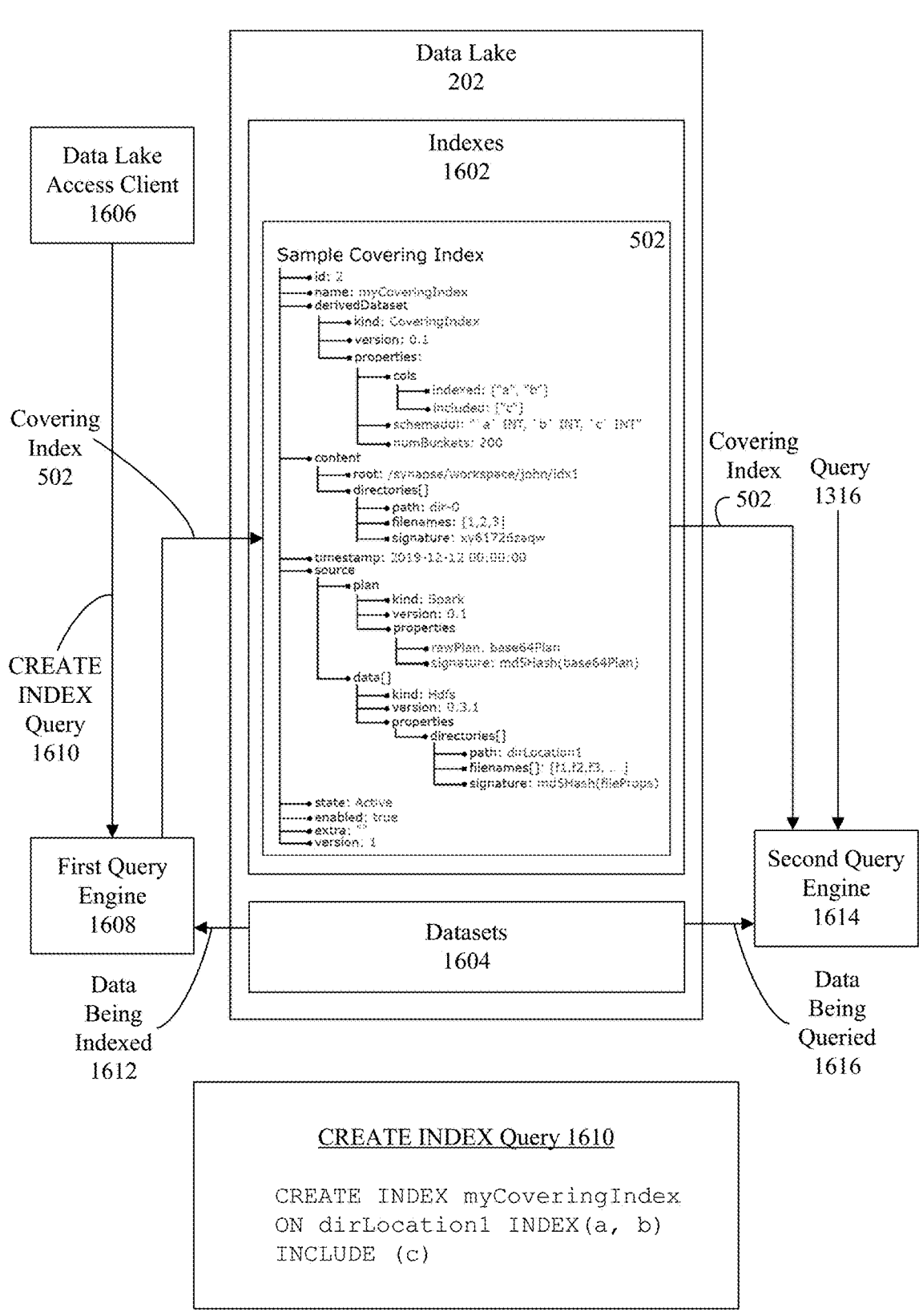
FIG. 16 depicts a schematic view of an example workload optimization system depicting aspects of multi-engine interoperability, according to an embodiment.

Further operational aspects of workload optimization system 1302 of FIG. 13 are described in conjunction with FIGS. 15 and 16. FIG. 15 depicts a flowchart of a multi-engine refinement to flowchart 1400 of FIG. 14, wherein a second query engine optimizes a query plan to utilize a pre-existing index discovered at a pre-determined location, according to an embodiment. FIG. 16 depicts a schematic view of an example workload optimization system 1600 including aspects of multi-engine interoperability, according to an embodiment. As shown in FIG. 16, workload optimization system 1600 includes a data lake 202, a data lake access client 1606, a first query engine 1608 and a second query engine 1614. Data lake 202 includes stored thereon indexes 1602 and datasets 1604. Indexes 1602 contains covering index 502 after its creation per the description herein below.

In an embodiment, the steps of flowchart 1500 of FIG. 15 are performed by, for example, second query engine 1614 as depicted in FIG. 16, and such steps assume the existence of a built index (e.g., covering index 502) on data lake 202 that was built by a different query engine. Therefore, prior to describing flowchart 1500 of FIG. 15, the creation of such an index by such a query engine will now be described with reference to workload optimization system 1600 of FIG. 16.

In an embodiment, first query engine 1608 may be configured to create an index on data lake 202 by receiving and executing an appropriate query against datasets 1604. For example, first query engine 1608 may receive CREATE INDEX query 1610 from data lake access client 1606, and execute that query over datasets 1604 to create covering index 502. In embodiments, the index corresponding to CREATE INDEX query 1610 is one determined per the process described herein above with respect to flowchart 1400 of FIG. 14 and workload optimization system 1302 of FIG. 13. In particular, and with reference to workload optimization system 1302, the index to be created by CREATE INDEX query 1610 may comprise one of selected indexes 1310 that were selected from amongst candidate indexes 1306 by index selector 1308.

Upon receipt of CREATE INDEX query 1610, first query engine 1608 may execute the query over datasets 1604, and more specifically, over data being indexed 1612 to generate covering index 502 that is thereafter stored on data lake 202 at the default pre-determined location specified in index specifications 214, as described in detail herein above, unless an alternative storage location is specified at index creation time (also as described above). In an embodiment, first query engine 1608 may correspond to query processor 1312 of FIG. 13. It should be understood, however, that candidate index generator 1304 and index selector 1308 may be separate from first query engine 1608 in some embodiments.

Having described index creation by workload optimization system 1600, further operational aspects of workload optimization system 1600 of FIG. 16 will now be described in conjunction with FIG. 15 which depicts a flowchart 1500 of a multi-engine refinement to flowchart 1400 of FIG. 14, wherein a second query engine optimizes a query plan to utilize a pre-existing index discovered at a pre-determined location, according to an embodiment. In an embodiment, flowchart 1500 may be performed by workload optimization system 1600 of FIG. 16. Although described with reference to workload optimization system 1600 as shown in FIG. 16, the method of FIG. 15 is not limited to that implementation. Indeed, as described further herein below, flowchart 1500 may likewise be performed by workload optimization system 1302 of FIG. 13. Other structural and operational embodiments will be apparent to persons skilled in the relevant art(s) based on the following discussion regarding flowchart 1500 of FIG. 15.

Flowchart 1500 begins at step 1502. At step 1502, a query is received. For example, second query engine 1614 may receive query 1316. Flowchart 1500 continues at step 1504.

At step 1504, a query plan for the query is generated. For example, second query engine 1614 of FIG. 16 may generate such an executable query plan in the manner described herein above with respect to step 1410 of flowchart 1400 of FIG. 14. More specifically, second query engine 1614 may be configured to operate like query processor 1312 of FIG. 13 to generate an intermediate query plan that is not configured to use any of the built indexes. Flowchart 1500 continues at step 1506.

At step 1506, the data lake is searched for built indexes stored at a predetermined location. For example, in embodiments, second query engine 1614 is configured to have knowledge of index specifications 214, and implement APIs such as, for example, user-facing index management APIs 226 described herein above, and thereby may discover any indexes that may exist on data lake 202 that are stored in the pre-determined default location as specified in index specifications 214. Accordingly, second query engine 1614 may discover covering index 502 at the pre-determined default location on data lake 202 and may thereafter retrieve index metadata raw query plan information for the index from rawPlan node 516 of covering index 502 as described herein above. Second query engine 1614 may examine the raw query plan to discover whether or not second query engine 1614 can use covering index 502. As described herein above, it may be that second query engine 1614 cannot use the index since it requires capabilities that are not available on second query engine 1614 (e.g., an unsupported hash function).

Second query engine 1614 may also, either before or after analysis of the raw query plan information described above, access index metadata including contents 504 and lineage 506, both described herein above, to determine, for example, the indexed and included columns (as well as their types), the data sources being indexed, and/or the physical location and layout of covering index 502. Some or all of such information may be useful for determining whether and how such an index may be leveraged by second query engine 1614. Flowchart 1500 continues at step 1508.

At step 1508, based on the index metadata for each built index found, it is determined whether the respective built index may be used to optimize the query plan and if so, the query plan is optimized to use the respective built index. For example, and with continued reference to workload optimization system 1600 of FIG. 16, second query engine 1614 having already received query 1316, and likewise having already discovered covering index 502, determined that covering index 502 is usable by the second query engine 1614 and the data sources indexed thereby, second query engine 1614 may use covering index 502 when building a query plan for query 1316, wherein such a query plan uses covering index 502 where possible in the manner described herein above with respect to workload optimization system 1302 to produce query result 1318. For example, second query engine 1614 may, apply a FilterIndexRule and/or JoinIndexRule to the query plan generated at step 1504 to provide an optimized query plan that is configured to use covering index 502 in the general manner described above regarding workload optimization system 1302 of FIG. 13, FilterIndexRule and/or JoinIndexRule being as described in conjunction with examples 900 and 1000 of FIGS. 9 and 10, respectively.

Flowchart 1500 concludes at step 1510. In step 1510, the optimized query plan is executed to provide a query result. For example, and with continued reference to workload optimization system 1600 of FIG. 16, second query engine 1614 may be configured to execute the query plan generated in step 1512 to generate a query result such as, for example, query result 1318 as depicted in FIG. 13. As known in the art, because the query plan was configured to use covering index 502, generating the query result requires fewer system resources (e.g., storage space, CPU cycles and/or memory) than executing the above described intermediate query plan that is not configured to use built indexes.

In the foregoing discussion of steps 1502-1410 of flowchart 1500, it should be understood that at times, such steps may be performed in a different order or even contemporaneously with other steps. For example, step 1506 wherein embodiments search the data lake for built indexes may be performed at any time prior to step 1508 including before a query is received at step 1502 or a query plan generated at step 1504. Likewise, in some embodiments it may be possible to determine based on index metadata whether one or more of the indexes found at step 1506 are per se incompatible with the query engine (e.g., second query engine 1614), thereby permitting step 1508 to be performed before steps 1502 and 1504 in some circumstances. Other operational embodiments will be apparent to persons skilled in the relevant art(s). Note also that the foregoing general description of the operation of workload optimization systems 1302 and 1600 of FIGS. 13 and 16, respectively, are provided for illustration only, and embodiments of workload optimization systems 1302 and 1600 may comprise different hardware and/or software, and may operate in manners different than described above.

III. Example Computer System Implementation

Each of data ingester 112, data digester 114, data modeler and server 116, query optimizer 1212, candidate index generator 1304, index selector 1308, query processor 1312, data lake access client 1606, first query engine 1608 and/or second query engine 1614, and flowcharts 1400 and/or 1500 may be implemented in hardware, or hardware combined with software and/or firmware. For example, data ingester 112, data digester 114, data modeler and server 116, query optimizer 1212, candidate index generator 1304, index selector 1308, query processor 1312, data lake access client 1606, first query engine 1608 and/or second query engine 1614 and flowcharts 1400 and/or 1500 may be implemented as computer program code/instructions configured to be executed in one or more processors and stored in a computer readable storage medium. Alternatively, data ingester 112, data digester 114, data modeler and server 116, query optimizer 1212, candidate index generator 1304, index selector 1308, query processor 1312, data lake access client 1606, first query engine 1608 and/or second query engine 1614, and flowcharts 1400 and/or 1500 may be implemented as hardware logic/electrical circuitry.

For instance, in an embodiment, one or more, in any combination, of data ingester 112, data digester 114, data modeler and server 116, query optimizer 1212, candidate index generator 1304, index selector 1308, query processor 1312, data lake access client 1606, first query engine 1608 and/or second query engine 1614, and flowcharts 1400 and/or 1500 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 17:
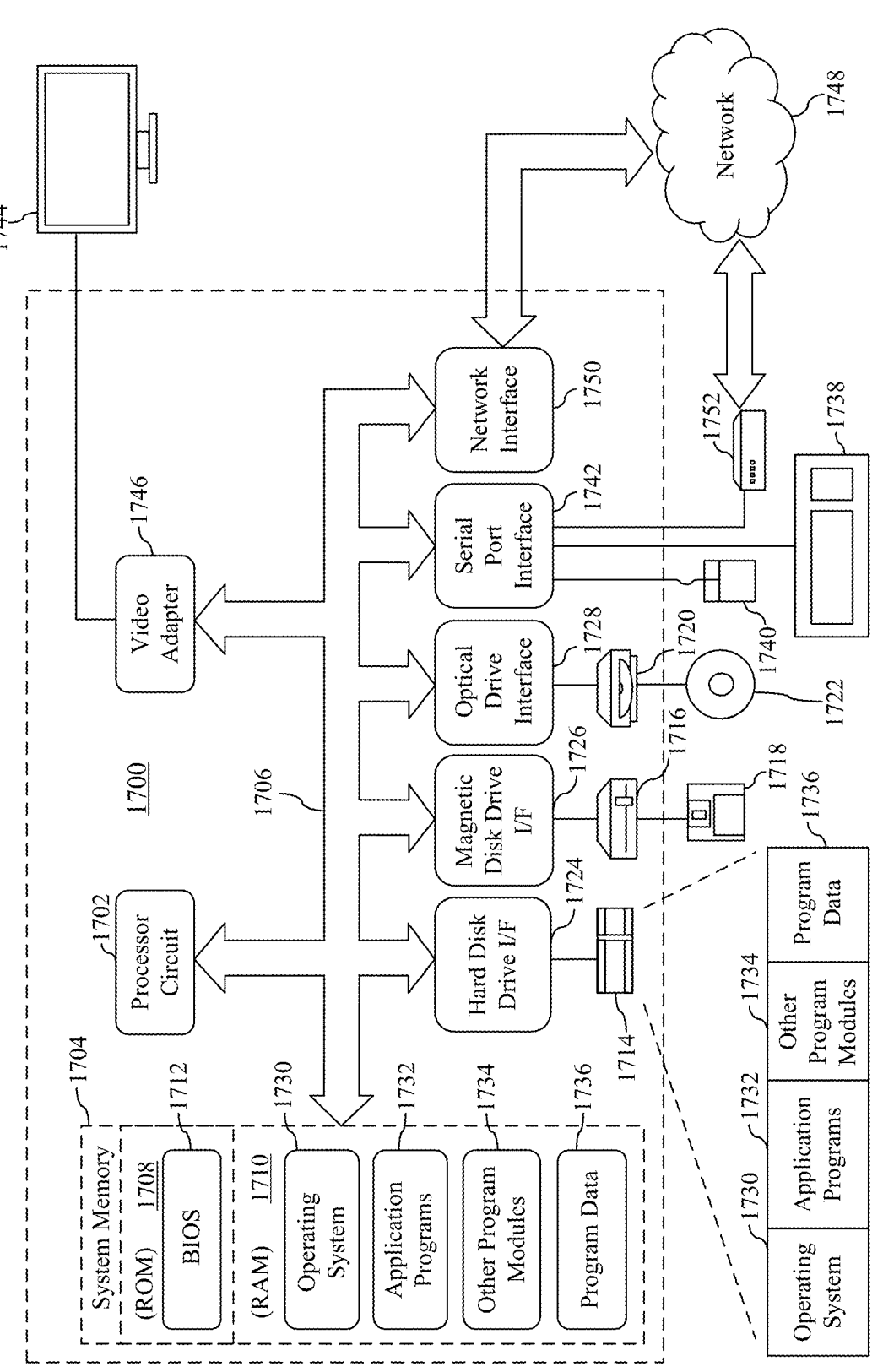
FIG. 17 is a block diagram of an example computer system in which embodiments may be implemented.

FIG. 17 depicts an exemplary implementation of a computing device 1700 in which embodiments may be implemented. For example, data ingester 112, data digester 114, data modeler and server 116, query optimizer 1212, candidate index generator 1304, index selector 1308, query processor 1312, data lake access client 1606, first query engine 1608 and/or second query engine 1614, and flowcharts 1400 and/or 1500 may be implemented in one or more computing devices similar to computing device 1700 in stationary or mobile computer embodiments, including one or more features of computing device 1700 and/or alternative features. The description of computing device 1700 provided herein is provided for purposes of illustration, and is not intended to be limiting. Embodiments may be implemented in further types of computer systems, as would be known to persons skilled in the relevant art(s).

As shown in FIG. 17, computing device 1700 includes one or more processors, referred to as processor circuit 1702, a system memory 1704, and a bus 1706 that couples various system components including system memory 1704 to processor circuit 1702. Processor circuit 1702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1702 may execute program code stored in a computer readable medium, such as program code of operating system 1730, application programs 1732, other programs 1734, etc. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

Computing device 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1730, one or more application programs 1732, other programs 1734, and program data 1736. Application programs 1732 or other programs 1734 may include, for example, computer program logic (e.g., computer program code or instructions) for implementing of data ingester 112, data digester 114, data modeler and server 116, query optimizer 1212, candidate index generator 1304, index selector 1308, query processor 1312, data lake access client 1606, first query engine 1608 and/or second query engine 1614, and flowcharts 1400 and/or 1500 (including any suitable step of flowcharts 1400 and/or 1500), and/or further embodiments described herein.

A user may enter commands and information into the computing device 1700 through input devices such as keyboard 1738 and pointing device 1740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1702 through a serial port interface 1742 that is coupled to bus 1706, but may be connected by other interfaces, such as a parallel port, game port, or a universal serial bus (USB).

A display screen 1744 is also connected to bus 1706 via an interface, such as a video adapter 1746. Display screen 1744 may be external to, or incorporated in computing device 1700. Display screen 1744 may display information, as well as being a user interface for receiving user commands and/or other information (e.g., by touch, finger gestures, virtual keyboard, etc.). In addition to display screen 1744, computing device 1700 may include other peripheral output devices (not shown) such as speakers and printers.

Computing device 1700 is connected to a network 1748 (e.g., the Internet) through an adaptor or network interface 1750, a modem 1752, or other means for establishing communications over the network. Modem 1752, which may be internal or external, may be connected to bus 1706 via serial port interface 1742, as shown in FIG. 17, or may be connected to bus 1706 using another interface type, including a parallel interface.

As used herein, the terms "computer program medium," "computer-readable medium," and "computer-readable storage medium" are used to refer to physical hardware media such as the hard disk associated with hard disk drive 1714, removable magnetic disk 1718, removable optical disk 1722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1732 and other programs 1734) may be stored on the hard disk, magnetic disk, optical disk, ROM, RAM, or other hardware storage medium. Such computer programs may also be received via network interface 1750, serial port interface 1742, or any other interface type. Such computer programs, when executed or loaded by an application, enable computing device 1700 to implement features of embodiments described herein. Accordingly, such computer programs represent controllers of the computing device 1700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A first query engine is provided herein. The first query engine configured to be coupled to a data lake, the data lake configured to store datasets and indexes based on the datasets on the data lake, the first query engine further configured to: receive a workload comprising a plurality of queries directed at the datasets; generate a set of candidate indexes based on the plurality of queries; select a predetermined number of candidate indexes from the set of candidate indexes based on a determination of an estimated performance improvement provided by the set of candidate indexes to performance of the workload; and build an index of the selected candidate indexes according to an index specification and store the built index at a predetermined location on the data lake, the predetermined location and index metadata included in the built index conforming to the index specification.

In another embodiment of the first query engine, the index metadata describes one or more of: contents of the built index; lineage of the built index; or state of the built index.

In another embodiment of the first query engine, the index metadata that describes the contents of the built index comprises one or more of: a name of the built index; a type of the built index; a configuration of the built index including identification of indexed and included columns and types of each; or a physical location and layout of the built index.

In another embodiment of the first query engine, the index metadata that describes the lineage of the built index comprises one or more of: one or more identifiers each corresponding to one or more data sources being indexed; a time at which the data source was indexed; or a descriptive history of the built index.

In another embodiment of the first query engine, the index metadata that describes the state of the built index comprises one or more state descriptors from the set of: enabled, disabled, creating or deleted.

In another embodiment of the first query engine, the index metadata that describes the lineage of the built index further comprises query plan information for an original query used to create the built index.

In another embodiment of the first query engine, the data lake is further configured to be coupled to second query engine different than the first query engine, the second query engine configured to: search the data lake for built indexes stored at the predetermined location; receive a query; determine based on the index metadata for each built index found by the search, whether the respective built index may be used to optimize a query plan for executing the query and if so, optimizing the query plan to use the respective built index; and execute the optimized query plan to provide a query result.

In another embodiment of the first query engine, the first and second query engines are further configured to determine, based on the metadata describing the lineage of the built index, whether the data source has been updated since the data source corresponding to the built index was indexed and if so, to rebuild the index using the raw query plan information.

A query processing workload optimization system configured to receive a workload comprising a plurality of queries is provided herein. The system comprising: one or more processors; and one or more memory devices accessible to the one or more processors, the one or more memory devices storing program code for execution by the one or more processors, the program code including: a first query processor coupled to a data lake, a candidate index generator and an index selector, wherein: the candidate index generator is configured to generate a set of candidate indexes based on the plurality of queries; and the index selector is configured to select a predetermined number of candidate indexes from the set of candidate indexes based on a determination of an estimated performance improvement provided by the set of candidate indexes to the performance of the workload; the first query processor configured to: build an index of the selected candidate indexes according to an index specification and store the built index at a predetermined location on the data lake, the predetermined location and index metadata included in the built index conforming to the index specification; receive a query; generate a query plan for the query, wherein the query plan is optimized to use the built index; and execute the query plan to generate a final query result.

In another embodiment of the query processing workload optimization system, the index metadata describes one or more of: contents of the built index; lineage of the built index; or state of the built index.

In another embodiment of the query processing workload optimization system, the index metadata that describes the contents of the built index comprises one or more of: a name of the built index; a type of the built index; a configuration of the built index including identification of indexed and included columns and types of each; or a physical location and layout of the built index.

In another embodiment of the query processing workload optimization system, the index metadata that describes the lineage of the built index comprises one or more of: one or more identifiers each corresponding to one or more data sources being indexed; a time at which the data source was indexed; or a descriptive history of the built index.

In another embodiment of the query processing workload optimization system, the metadata that describes the state of the built index includes one or more state descriptors from the set of: enabled, disabled, creating or deleted.

In another embodiment of the query processing workload optimization system, the metadata that describes the lineage of the built index further comprises raw query plan information for an original query used to create the built index.

In another embodiment of the query processing workload optimization system, the system further comprises a second query processor coupled to the data lake, the second query processor configured to: receive a query; generate a query plan for the query; search the data lake for built indexes stored at the predetermined location; determine based on the index metadata for each built index found, whether the respective built index may be used to optimize the query plan and if so, optimize the query plan to use the respective built index; and execute the optimized query plan to provide a query result.

In another embodiment of the query processing workload optimization system, the first and second query processors are further configured to determine, based on the metadata describing the lineage of the built index, whether the data source has been updated since the data source corresponding to the built index was indexed and if so, to rebuild the index using the raw query plan information.

A query processing workload optimization system configured to receive a workload comprising a plurality of queries is provided herein. The system comprising: a data lake configured to store thereon datasets and indexes based on the datasets; at least one processor configured to be coupled to the data lake; and at least one memory that stores program code configured to be executed by the at least one processor to perform operations, the operations comprising: receiving a workload comprising a plurality of queries directed at the datasets; generating a set of candidate indexes based on the plurality of queries; selecting a predetermined number of candidate indexes from the set of candidate indexes based on a determination of an estimated performance improvement provided by the set of candidate indexes to performance of the workload; and building an index of the selected candidate indexes according to an index specification and store the built index at a predetermined location on the data lake, the predetermined location and index metadata included in the built index conforming to the index specification.

In another embodiment of the query processing workload optimization system, the index metadata describes one or more of: contents of the built index; lineage of the built index; or state of the built index.

In another embodiment of the query processing workload optimization system, the index metadata that describes the lineage of the built index comprises on or more of: one or more identifiers each corresponding to one or more data sources being indexed; a time at which the data source was indexed; a descriptive history of the built index; or raw query plan information for an original query used to build the index.

In another embodiment of the query processing workload optimization system, the operations further comprise determining, based on the metadata that describes the lineage of the built index, whether the data source corresponding to the built index has been updated since the data source was indexed and if so, rebuilding the index using the raw query plan information.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A query processing workload optimization system comprising:

a processor circuit; and memory accessible to the processor circuit, the memory storing program code for execution by the processor circuit, the program code including:

a query processor that:

generates a query plan for a query;

searches a data lake for built indexes stored at a predetermined location;

determines, based on index metadata for found built indexes, a plurality of compatible index pairs of the found built indexes;

selects a compatible index pair from the plurality of compatible index pairs based on the selected compatible index pair having a largest number of partitions;

optimizes the query plan to use the selected compatible index pair; and executes the optimized query plan to provide a query result.

2. The query processing workload optimization system of claim 1, wherein to determine the plurality of compatible index pairs of the found built indexes the query processor:

searches the query plan for a pattern that matches a pattern of an indexing rule; and determines the plurality of compatible index pairs meet a condition of the matched pattern of the query plan.

3. The query processing workload optimization system of claim 2, wherein the matched pattern of the query plan corresponds to a join operator, and the query processor further replaces the matched pattern with a join operator corresponding to the selected compatible index pair.

4. The query processing workload optimization system of claim 2, wherein the matched pattern of the query plan corresponds to a filter operator, and the query processor further replaces the matched pattern with a filter operator corresponding to the selected compatible index pair.

5. The query processing workload optimization system of claim 1, wherein the index metadata for the found built indexes comprises a creating state descriptor.

6. The query processing workload optimization system of claim 1, wherein the partitions of the selected compatible index pair are partitioned using a hash function.

7. The query processing workload optimization system of claim 1, wherein the selected index pair comprises an arbitrary uniform resource identifier (URI) that refers to a chunk of data stored in the data lake, and to optimize the query plan the query processor:

prunes blocks for the query plan based on the arbitrary URI.

8. A method comprising:

generating a query plan for a query;

searching a data lake for built indexes stored at a predetermined location;

determining, based on index metadata for found built indexes, a plurality of compatible index pairs of the found built indexes;

selecting a compatible index pair from the plurality of compatible index pairs, the selected compatible index pair comprising an arbitrary uniform resource identifier (URI) that refers to a chunk of data stored in the data lake;

optimizing the query plan to use the selected compatible index pair by pruning blocks for the query plan based on the arbitrary URI; and executing the optimized query plan to provide a query result.

9. The method of claim 8, wherein said determining the plurality of compatible index pairs of the found built indexes comprises:

searching the query plan for a pattern that matches a pattern of an indexing rule; and determining the plurality of compatible index pairs meet a condition of the matched pattern of the query plan.

10. The method of claim 9, wherein the matched pattern of the query plan corresponds to a join operator, and the method further comprises:

replacing the matched pattern with a join operator corresponding to the selected compatible index pair.

11. The method of claim 9, wherein the matched pattern of the query plan corresponds to a filter operator, and the method further comprises:

replacing the matched pattern with a filter operator corresponding to the selected compatible index pair.

12. The method of claim 8, wherein the index metadata for the found built indexes comprises a deleted state descriptor.

13. The method of claim 8, wherein partitions of the selected compatible index pair are partitioned using a hash function.

14. The method of claim 8, wherein said selecting the compatible index pair comprises:

arbitrarily selecting the compatible index pair from the plurality of compatible index pairs.

15. The method of claim 8, wherein said selecting the compatible index pair comprises:

selecting the compatible index pair from the plurality of compatible index pairs based on the selected compatible index pair having a number of portions larger than another compatible index pair.

16. A system comprising:

a data lake storing datasets and indexes based on the datasets, the datasets comprising a chunk of data;

a processor circuit coupled to the data lake; and memory that stores program code structured to cause the processor circuit to:

generate a query plan for a query;

search the data lake for built indexes stored at a predetermined location;

determine, based on index metadata for found built indexes, a plurality of compatible index pairs of the found built indexes;

select a compatible index pair from the plurality of compatible index pairs, the selected compatible index pair comprising an arbitrary uniform resource identifier (URI) that refers to the chunk;

optimize the query plan to use the selected compatible index pair by pruning blocks for the query plan based on the arbitrary URI; and execute the optimized query plan to provide a query result.

17. The system of claim 16, wherein to determine the plurality of compatible index pairs of the found built indexes, the program code is structured to cause the processor to:

search the query plan for a pattern that matches a pattern of an indexing rule; and determine the plurality of compatible index pairs meet a condition of the matched pattern of the query plan.

18. The system of claim 17, wherein the matched pattern of the query plan corresponds to a join operator, and the program code is further structured to cause the processor to:

replace the matched pattern with a join operator corresponding to the selected compatible index pair.

19. The system of claim 17, wherein the matched pattern of the query plan corresponds to a filter operator, and the program code is further structured to cause the processor to:

replace the matched pattern with a filter operator corresponding to the selected compatible index pair.

20. The system of claim 16, wherein the index metadata for the found built indexes comprises a creating state descriptor.

\* \* \* \* \*